(12) United States Patent
Balogh et al.

(10) Patent No.: US 12,483,152 B2
(45) Date of Patent: Nov. 25, 2025

(54) BIAS GENERATION FOR POWER CONVERTER

(71) Applicant: Texas Instruments Incorporated, Dallas, TX (US)

(72) Inventors: Laszlo Balogh, Merrimack, NH (US); Michael Lueders, Freising (DE); Stefan Herzer, Marzling (DE); Maik Peter Kaufmann, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 104 days.

(21) Appl. No.: 18/141,245

(22) Filed: Apr. 28, 2023

(65) Prior Publication Data

US 2024/0313660 A1 Sep. 19, 2024

Related U.S. Application Data

(60) Provisional application No. 63/452,604, filed on Mar. 16, 2023.

(51) Int. Cl.
| | |
|---|---|
| *H02M 3/335* | (2006.01) |
| *H02M 1/00* | (2006.01) |
| *H02M 1/36* | (2007.01) |

(52) U.S. Cl.
CPC ..... *H02M 3/33576* (2013.01); *H02M 1/0009* (2021.05); *H02M 1/0025* (2021.05); *H02M 1/36* (2013.01)

(58) Field of Classification Search
CPC .......... H02M 3/33576; H02M 1/0009; H02M 1/0025; H02M 1/36

USPC ........................................... 363/17
See application file for complete search history.

(56) References Cited

U.S. PATENT DOCUMENTS

| | | | | |
|---|---|---|---|---|
| 10,103,633 | B1* | 10/2018 | Knoedgen | H02M 7/487 |
| 2014/0300338 | A1* | 10/2014 | Giombanco | H02M 3/33576 323/355 |
| 2016/0261187 | A1* | 9/2016 | Deng | H02M 3/1588 |
| 2024/0313656 | A1* | 9/2024 | Pervaiz | H02M 1/088 |

OTHER PUBLICATIONS

Zhang, et al., "A Novel Method of Auxiliary Power Supply Used in Wide-Range High Voltage Input DC-DC Converter," Scientific Research Publishing, Energy and Power Engineering, Apr. 6, 2017, pp. 703-713.

(Continued)

*Primary Examiner* — Yemane Mehari
(74) *Attorney, Agent, or Firm* — Ming Wai Choy; Frank D. Cimino

(57) ABSTRACT

A self-biasing circuit for power converters is disclosed. In an example, an apparatus includes a first transistor coupled between an inductor terminal and a ground terminal, and a second transistor coupled between the inductor terminal and a bias terminal. The first transistor has a first control terminal, and the second transistor has a second control terminal. In an example, the first and second transistors are configured to split a current at the inductor terminal. The apparatus further includes a controller having first and second control outputs, where the first control output is coupled to the first control terminal, the second control output is coupled to the second control terminal.

23 Claims, 24 Drawing Sheets

(56) References Cited

OTHER PUBLICATIONS

Widlar, et al., "Foldback Current Limiting," ScienceDirect, Analog Circuit Design, 2011. 5 pages.

Wang, et al., "Methods to Eliminate Damage Caused by Reverse Current in Synchronous Buck Converters," Texas Instruments, Application Report—SLUA962, May 2019. pp. 1-8.

"TPS5433xA 4.5-V to 28-V Input, 3-A Output, Synchronous Step-Down DC-DC Converter," Texas Instruments, SLVSCD5D—Nov. 2014—Revised Feb. 2016. 58 pages.

"TPS56637 4.5-V to 28-V Input, 6-A Synchronous Buck Converter," Texas Instruments, SLVSEG1A—Jul. 2018—Revised Sep. 2019. 33 Pages.

"TPS563202 4.3-V to 17-V Input, 3-A Synchronous Buck Converter in SOT563," Texas Instruments, SLUSDL8B—Dec. 2019—Revised Apr. 2021. 26 pages.

"TPS563202S 4.3-V to 17-V Input, 3-A ECO Mode Synchronous Buck Converter in SOT563," SLUSED8—Oct. 2020. 26 pages.

\* cited by examiner

BIAS GENERATION FOR POWER CONVERTER

CROSS REFERENCE TO RELATED APPLICATION

This application is related to U.S. application Ser. No. 18/184,913, filed on Mar. 16, 2023, which is hereby incorporated by reference in its entirety. This application claims the benefit of and priority to U.S. Provisional Application No. 63/452,604, filed on Mar. 16, 2023, which is hereby incorporated by reference in its entirety.

BACKGROUND

A power converter can transfer power from a power source to a load. As part of power transfer, the power converter can also convert between an alternating current (AC) voltage and a direct current (DC) voltage (e.g., as an off-line converter) or between different DC voltages. The power converter can also regulate the output voltage to the load at a target voltage. A power converter may include various control circuits that control the operation of the power converter, and those control circuits also receive power from the power source.

SUMMARY

In an example, an apparatus comprises a first transistor coupled between an inductor terminal and a ground terminal, and a second transistor coupled between the inductor terminal and a bias terminal. The first transistor has a first control terminal, and the second transistor has a second control terminal. In an example, the first and second transistors are configured to split a current at the inductor terminal. The apparatus further comprises a controller having first and second control outputs, where the first control output is coupled to the first control terminal, the second control output is coupled to the second control terminal.

In another example, a power conversion system comprises an inductor coupled between a power converter input and a switching terminal, a first transistor coupled between the switching terminal and a ground terminal, a second transistor coupled between the switching terminal and a bias terminal, and a third transistor coupled between the second transistor and the ground terminal. The first transistor has a first control terminal, the second transistor has a second control terminal, and the third transistor has a third control terminal. In an example, the power conversion system further comprises a controller having first and second control inputs and first and second control outputs, the first control input coupled to at least one of the switching terminal or a power converter output, the second control input coupled to the bias terminal, the first control output coupled to the first control terminal and the third control terminal, and the second control output coupled to the second control terminal.

In yet another example, a method comprises connecting a switching terminal of a power converter to a bias terminal to generate a bias voltage by discharging parasitic capacitance of the power converter. In an example, the method further includes responsive to the bias voltage exceeding a reference voltage, connecting the switching terminal to a ground terminal, and disconnecting the switching terminal from the bias terminal and the ground terminal.

DETAILED DESCRIPTION

Figure 1A:
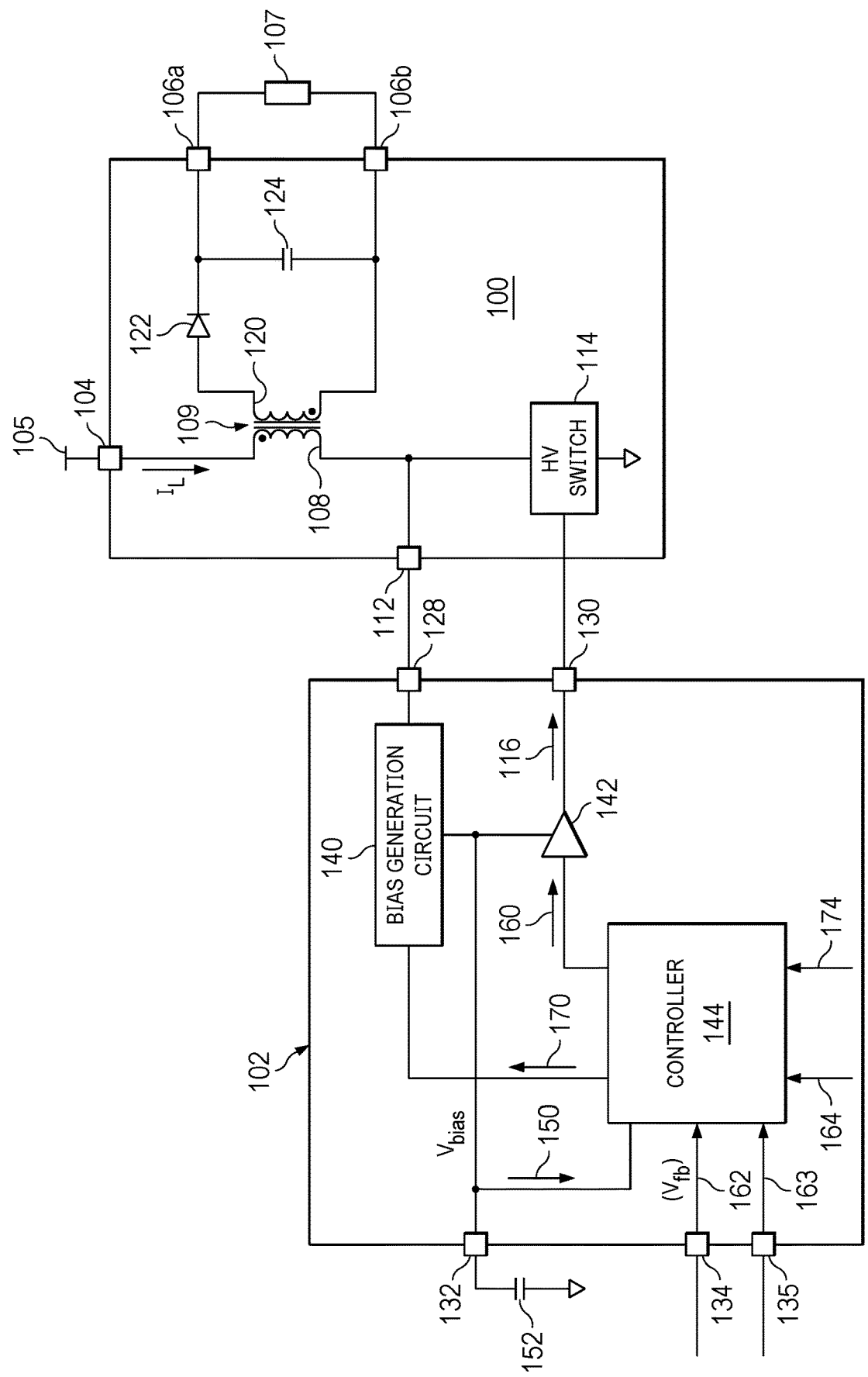
FIG. 1A and FIG. 1B are schematics illustrating examples of a power conversion system including a bias generation circuit.
Figure 1B:
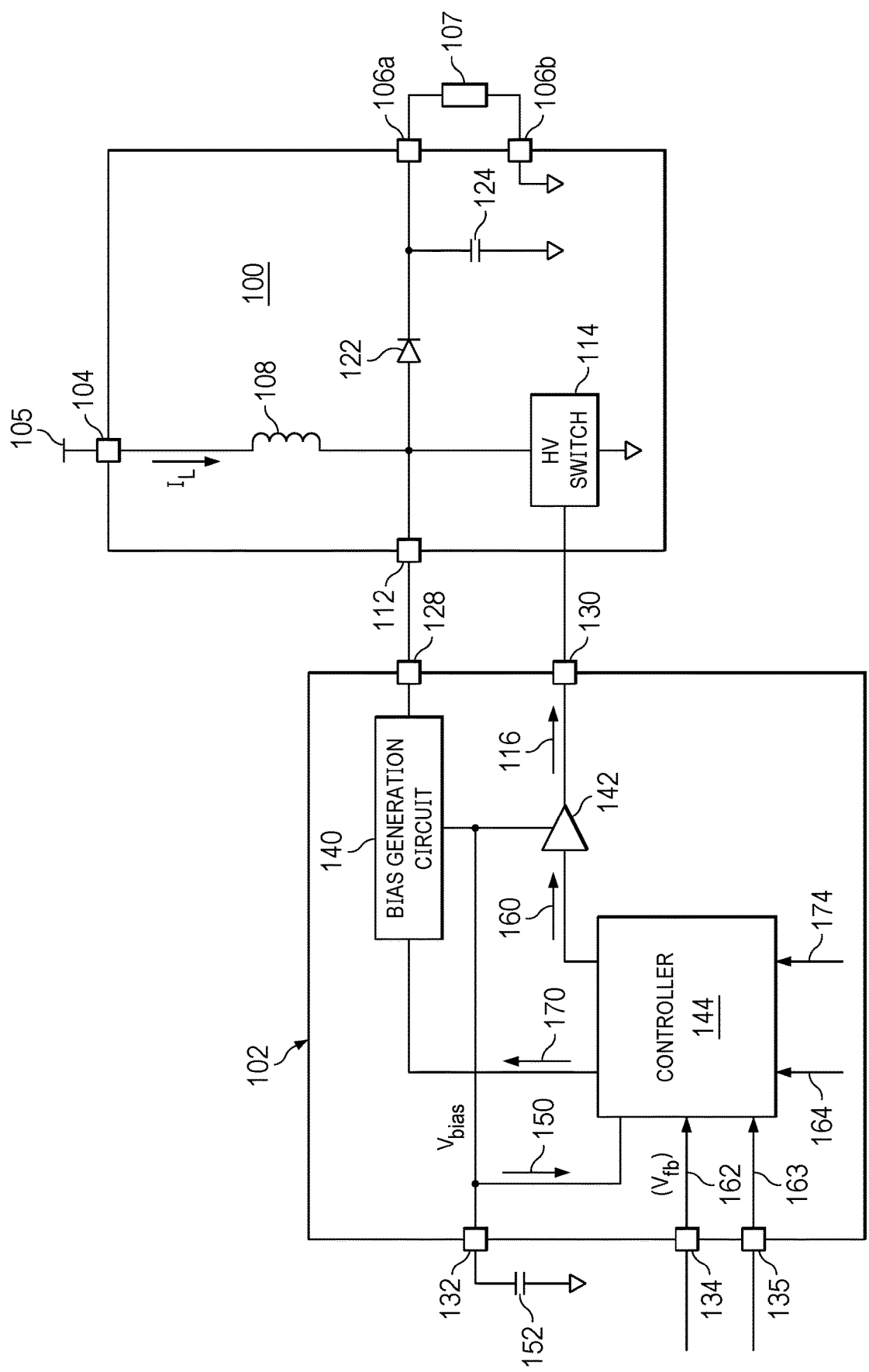

FIG. 1A and FIG. 1B are schematics that illustrate examples of a power conversion system. The example power conversion system includes a power converter 100 and a power converter control circuit 102 (also referred to herein as control circuit 102). Power converter 100 has a power input terminal 104 coupled to a power source 105 and power output terminals 106a and 106b coupled to a load 107. In some examples, power source 105 can provide an input AC voltage, and power converter 100 can include a rectifier (not shown in the figures) to convert the input AC voltage to an intermediate DC voltage (e.g., as an off-line converter), and then convert the intermediate DC voltage to an output DC voltage. In some examples, power source 105 can provide an input DC voltage (e.g., as a battery), and power converter 100 can provide an output DC voltage. Power converter 100 can receive an input voltage $V_{in}$ at power input terminal 104.

In FIG. 1A, power converter 100 can include a flyback converter. The flyback converter includes a transformer 109 having a primary side coil 108 coupled between power input terminal 104 and a switching terminal 112. The flyback converter also includes a switch 114 coupled between switching terminal 112 and a ground terminal. Switch 114 can include a transistor, such as a field effect transistor (FET), that can tolerate a relatively high voltage (e.g., 700V or above) across the transistor. Transformer 109 also includes a secondary side coil 120 coupled to a diode 122, and a capacitor 124, where diode 122 can be coupled between one end of secondary coil 106 and one end of capacitor 124, and capacitor 124 can be coupled between power output terminals 106a and 106b.

The flyback converter can control the transfer of power from power input terminal 104 to power output terminals 106a/b via the switching of switch 114. Specifically, when switch 114 is turned on, a current flows through primary side coil 108 and switch 114. The current increases with time, with the rate of increase based on the input voltage across primary side coil 108 and the inductance of primary side coil 108, and magnetic energy is stored in transformer 109. When switch 114 is turned off, the transformer voltage reverses, and the magnetic energy stored in transformer 109 is dissipated in the form of current flow from secondary side coil 120 to power output terminals 106a and 106b. The secondary side coil current decreases with time as the magnetic energy dissipates. The current can charge capacitor 124, and the flyback converter can provide an output voltage $V_{out}$ between power output terminals 106a and 106b.

In FIG. 1A, switch 114 can be controlled by a multi-cycle control signal 116 provided by control circuit 102. The duty cycle of the control signal, together with a turn ratio between the primary and second side coils and the inductance of the primary side coil 108, can set a ratio between the output voltage and the input voltage, as well as the amount of power transferred from power source 105 to load 107. Accordingly, control circuit 102 can regulate the output voltage by setting the duty cycle of control signal 116. Control circuit 102 can control the flyback converter to operate in various modes of operation, such as discontinuous conduction mode (DCM), transition mode (TM), quasi resonant mode (QR), and continuous conduction mode (CCM). In DCM, TM, and QR operations, the primary side coil current increases from zero to reach a first peak value, and the secondary side coil current decreases from a second peak value to zero. In CCM operation, the primary side coil current increases from a first non-zero initial value to reach a first peak value, and the secondary side coil current decreases from a second peak value to a second non-zero final value.

Also, in FIG. 1B, power converter 100 can include a boost converter. The boost converter includes an inductor 108 coupled between power input terminal 104 and switching terminal 112, and switch 114 coupled between switching terminal 112 and ground. The boost converter also includes diode 122 and capacitor 124, where diode 122 is coupled between switching terminal 112 and one end of capacitor 124, and capacitor 124 is coupled between power output terminal 106a and power output terminal 106b, which is coupled to ground in FIG. 1B. In FIG. 1B, power output terminal 106b is coupled to ground. The boost converter can control the transfer of power from power input terminal 104 to power output terminals 106a/b via the switching of switch 114. When switch 114 is turned on, current flows through inductor 108 and switch 114. The current increases with time, with the rate of increase based on the input voltage across inductor 108 and the inductance of inductor 108, and magnetic energy is stored in inductor 108. When switch 114 is turned off, the magnetic energy stored in inductor 108 is dissipated in the form of current flow to power output terminal 106a and ground. The inductor current decreases with time as the magnetic energy dissipates. The current can charge capacitor 124, and the boost converter can provide an output voltage $V_{out}$ between power output terminals 106a and 106b.

In FIG. 1B, switch 114 can also be controlled by a multi-cycle control signal 116 provided by control circuit 102. A duty cycle of the control signal can set the ratio between the output voltage and the input voltage or the amount of power transferred from power source 105 to load 107. Accordingly, control circuit 102 can regulate the output voltage by setting the duty cycle of control signal 116. Also, control circuit 102 can operate the boost converter in various modes, such as DCM, TM, and CCM modes of operations.

In both FIG. 1A and FIG. 1B, control circuit 102 has a charge input 128, a control output 130, a bias output 132, a feedback input 134, and a switching trigger input 135. Charge input 128 of control circuit 102 can be coupled to switching terminal 112 of power converter 100. Control circuit 102 also includes a bias generation circuit 140, a driver 142, and a controller 144. Bias generation circuit 140 generates a bias signal 150, and provide the bias signal to driver 142 and controller 144. The bias signal can include a voltage (labelled Vbias) and a current to supply power to both driver 142 and controller 144. Bias generation circuit 140 can have an input coupled to switching terminal 112, and an output coupled to a bias output 132. Bias output 132 can be coupled to a capacitor 152. As further described below, during the switching of switch 114, bias generation circuit 140 can receive charge stored in parasitic capacitance of the switch 114 and/or parasitic capacitance of the primary side coil/inductor 108 via charge input 128, and store the charge into capacitor 152. Capacitor 152 can then discharge to provide bias signal 150 to driver 142 and controller 144, and to other circuits. Such arrangements can divert some of the charge stored in these parasitic capacitances to provide power to driver 142 and controller 144, which can reduce the power lost in the charging and discharging of these parasitic capacitances, while reducing/eliminating the need for additional power from the power source to generate the bias signal and to supply power to driver 142 and controller 144, which can improve the efficiency of power converter 100. Moreover, as to be described below, bias generation circuit 140 can include components that can be integrated on the same semiconductor die or within the same IC package as other components of control circuit 102 and/or switch 114, which can reduce the overall footprint of control circuit 102 and a power conversion system including control circuit 102 and power converter 100.

Controller 144 can provide a control signal 160 to driver 142, which can provide control signal 116 as a buffered version of control signal 160. Specifically, controller 144 can also receive a feedback voltage 162 (also labelled $V_{fb}$) via feedback input 134 and a first reference voltage 164. Feedback voltage 162 can represent, for example, a voltage representative of the output voltage across power output terminals 106a and 106b. In some examples, controller 144 compares the feedback voltage 162 with a first reference voltage 164, and based at least in part on the comparison, determines the duty cycle of control signals 116/160. In some examples, first reference voltage 164 can represent a target of feedback voltage 162, and controller 144 can set the duty cycle of control signals 116/160 to regulate feedback voltage 162 at close to first reference voltage 164. Also, in some examples, controller 144 can receive a switching trigger signal 163 via switching trigger input 135 and start a new switching cycle responsive to switching trigger signal 163. Controller 144 can receive switching trigger signal 163 from various sources, such as a clock generator, a zero current detector, a timer, etc. In a case where power converter 100 operate in quasi-resonant (QR) mode, switching trigger input 135 can be coupled to switching terminal 112, where controller 144 can receive the switching terminal voltage as switching trigger signal 163. In such examples, controller 144 can perform valley detection of the switching terminal voltage to detect when the voltage across switch 114 reaches a minimum, and start a switching cycle responsive to detecting the valley.

Also, controller 144 can provide one or more control signals 170 to bias generation circuit 140 to control the transfer of charge from the parasitic capacitances of inductor 108 and switch 114 to capacitor 152. As to be described below, controller 144 can generate control signals 170 based on control signal 160, so as to control the transfer of charge stored in parasitic capacitance of the switch 114 and/or parasitic capacitance of the primary side coil/inductor 108 into capacitor 152 based on the switching of switch 114. Also, controller 144 can receive a second reference voltage 174, compare the voltage of bias signal 150 ($V_{bias}$) with the second reference voltage 174, and adjust control signals 170 based on the comparison result. Accordingly, controller 144 can regulate the $V_{bias}$ voltage at or around second reference voltage 174. With such arrangements, the variation of the $V_{bias}$ voltage (e.g., due to variation of input/output voltages) can be eliminated, or at least reduced, which can also improve the robustness of controller 144, driver 142, or other circuits that rely on bias signal 150 for power.

Figure 2:
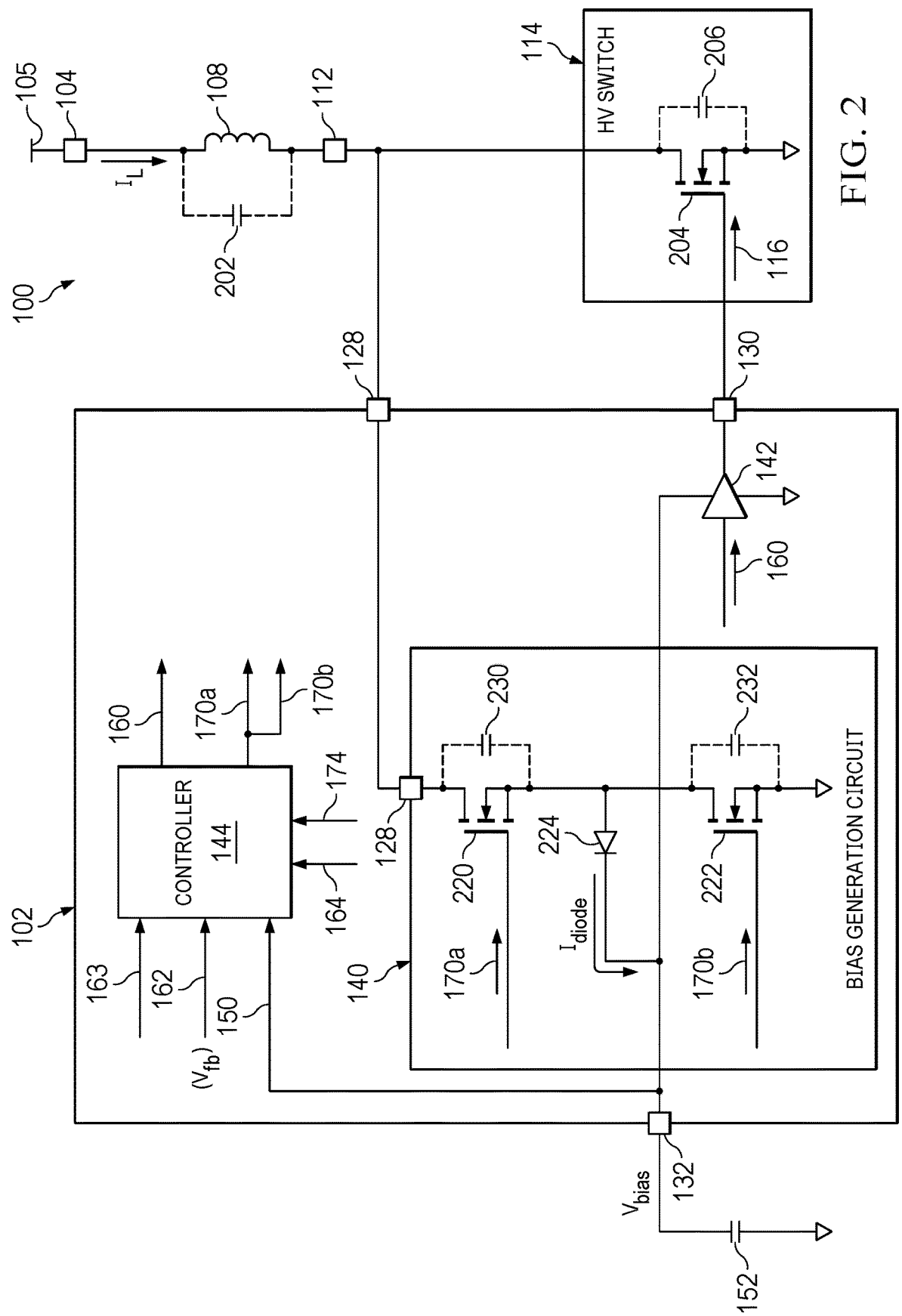
FIGS. 2, FIG. 3A, and FIG. 3B are schematics illustrating example internal components of the power converter and bias generation circuit of FIGS. 1A and 1B.
Figure 3A:
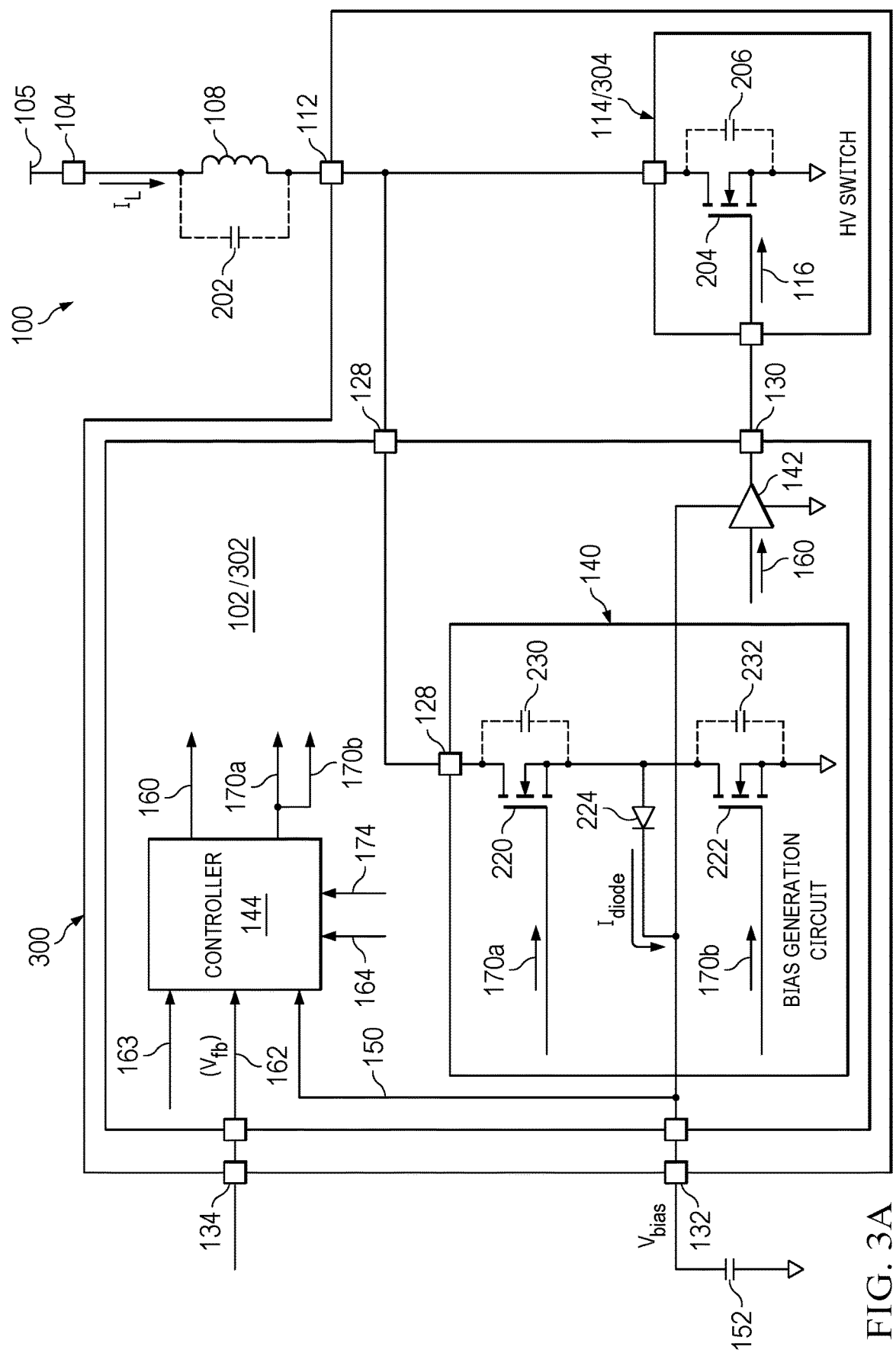
Figure 3B:
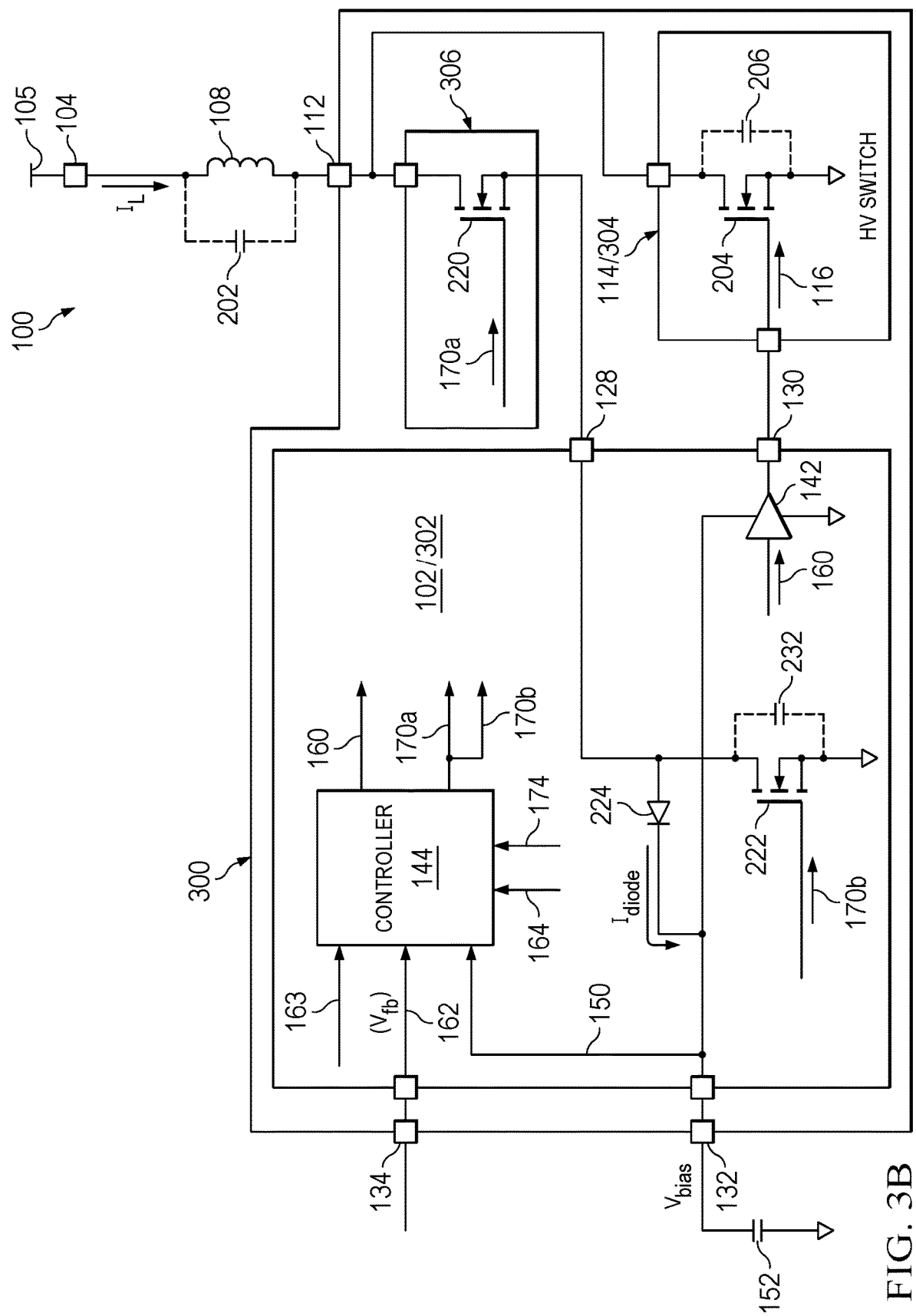

FIGS. 2, 3A, and FIG. 3B illustrate example internal components of power converter 100 and control circuit 102. Referring to FIG. 2, primary side coil/inductor 108 can include a parasitic capacitance represented by a capacitor 202. Also, switch 114 can include a transistor 204, which can be an NFET, or other types of transistors. In some examples, the transistor 204 can tolerate a relatively high voltage range of, for example, 100-700 volts (V). In some examples, the transistor 204 is a silicon carbide (SiC) based transistor to tolerate a voltage higher than 700 V. The transistor 204 has a first current terminal (e.g., drain) coupled to the primary side coil/inductor 108 and a second current terminal (e.g., source) coupled to a ground terminal. A control terminal (e.g., gate) of the transistor 204 is coupled to the control output 130 to receive control signal 116 from driver 142. Transistor 204 can have a parasitic capacitance (e.g., Coss) represented as capacitor 206 coupled between the current terminals (e.g., drain and source) of transistor 204.

Also, bias generation circuit 140 includes a transistor 220, a transistor 222, and a diode 224. Transistor 220 is coupled between switching terminal 112 (via charge input 128) and an anode of diode 224, and a cathode of diode 224 is coupled to bias terminal 132. Also, transistor 222 is coupled between the anode of diode 224 and the ground terminal. Transistors 220 and 222 can be NFETs or other types of transistors. The control terminals of transistors 220 and 222 can be coupled to the outputs of controller 144 to receive control signals 170. Transistor 220 can receive control signal 170a, and transistor 222 can receive control signal 170b. As to be described below, control signal 170b can have the same duty cycle and same transition times as control signal 160/116 received by switch 114. In some examples, transistor 220 can tolerate a relatively high voltage (e.g., 100-700V), and transistor 222 can tolerate a relatively low voltage (e.g., 10-100V). Transistor 220 can have a parasitic capacitance (e.g., Coss) across current terminals represented by a capacitor 230, and transistor 222 can have a parasitic capacitance (e.g., Coss) across current terminals represented by a capacitor 232.

Referring to FIG. 3A, control circuit 102 and switch 114 can be in an integrated circuit 300. In some examples, controller circuit 102 can be part of a semiconductor die 302, and switch 114 can be part of a semiconductor die 304. In some examples, semiconductor dies 302 and 304 can be of a same semiconductor die or otherwise have the same process node. In some examples, semiconductor dies 302 and 304 can be of different dies, and integrated circuit 300 can include interconnects (e.g., bond wires, package substrate connections, etc.) that provide electrical connections between the two dies. In some examples, semiconductor dies 302 and 304 can be of different process nodes or otherwise include transistors of different properties. For example, semiconductor die 302 can include transistors that tolerate a relatively low voltage (e.g., 10-700V), and semiconductor die 304 can include transistors that tolerate a relatively high voltage (e.g., above 700V).

Also, referring to FIG. 3B, transistor 220 can be on a separate semiconductor die from transistor 222 and the rest of control circuit 102. For example, transistor 220 can be on a semiconductor die 306. In some examples, semiconductor dies 304 and 306 can be of the same semiconductor die or otherwise have the same process node (e.g., having devices that tolerate high voltage).

Figure 4:
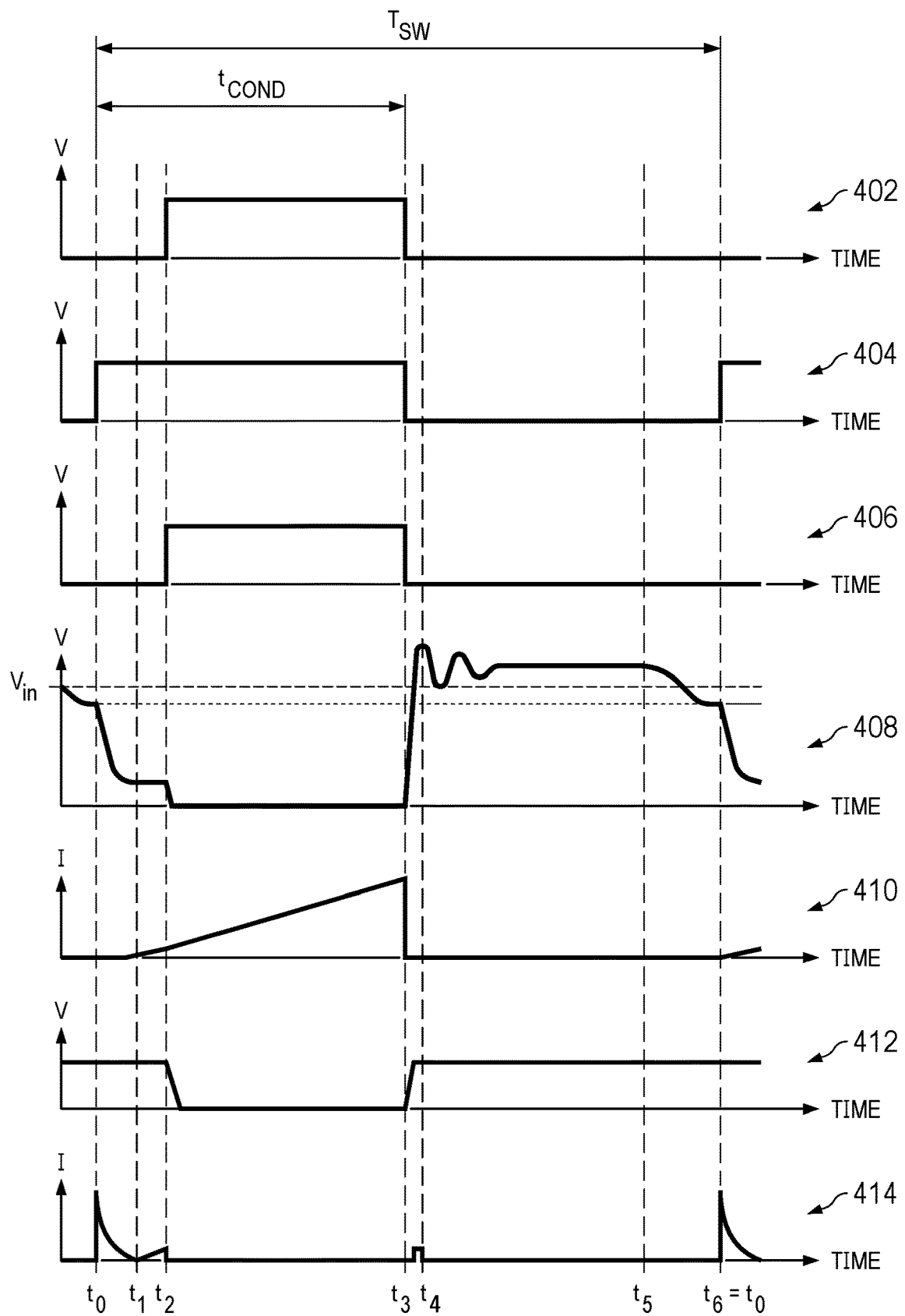
FIG. 4 includes graphs that illustrate example operations of the power converter and bias generation circuit of FIGS. 1A-3.

FIGS. 4, 5A, 6A, 7A, 8A, 9A, 10A, and 11A include graphs 402, 404, 406, 408, 410, 412, and 414 that illustrate example operations of power converter 100 and bias generation circuit 140. Graph 402 represents example variation of control signal 160 (for transistor/switch 114) with time, graph 404 represents example variation of control signal 170a (for transistor 220), graph 406 represents example variation of control signal 170b (for transistor 222), graph 408 represents example variation of a voltage at switching terminal 112 with time, graph 410 represents example variation of inductor current $I_L$ through primary side coil 108 with time, graph 412 represents example variation of a voltage at an anode of the diode 224 (of bias generator circuit 140) with time, and graph 414 represents example variation of current through diode 224 (of bias generator circuit 140) with time. FIG. 4 illustrates the example operations between times $t_0$-$t_6$ representing a switching cycle period $T_{sw}$ of the power converter. FIGS. 5A, 6A, 7A, 8A, 9A, 10A, and 11A illustrate example operations at different intervals between times $t_0$-$t_6$, and FIGS. 5B, 6B, 7B, 8B, 9B, 10B, and 11B include schematics that illustrate example flow of current in power converter 100 and bias generation circuit 140 in the operations between $t_0$-$t_6$.

Figure 5A:
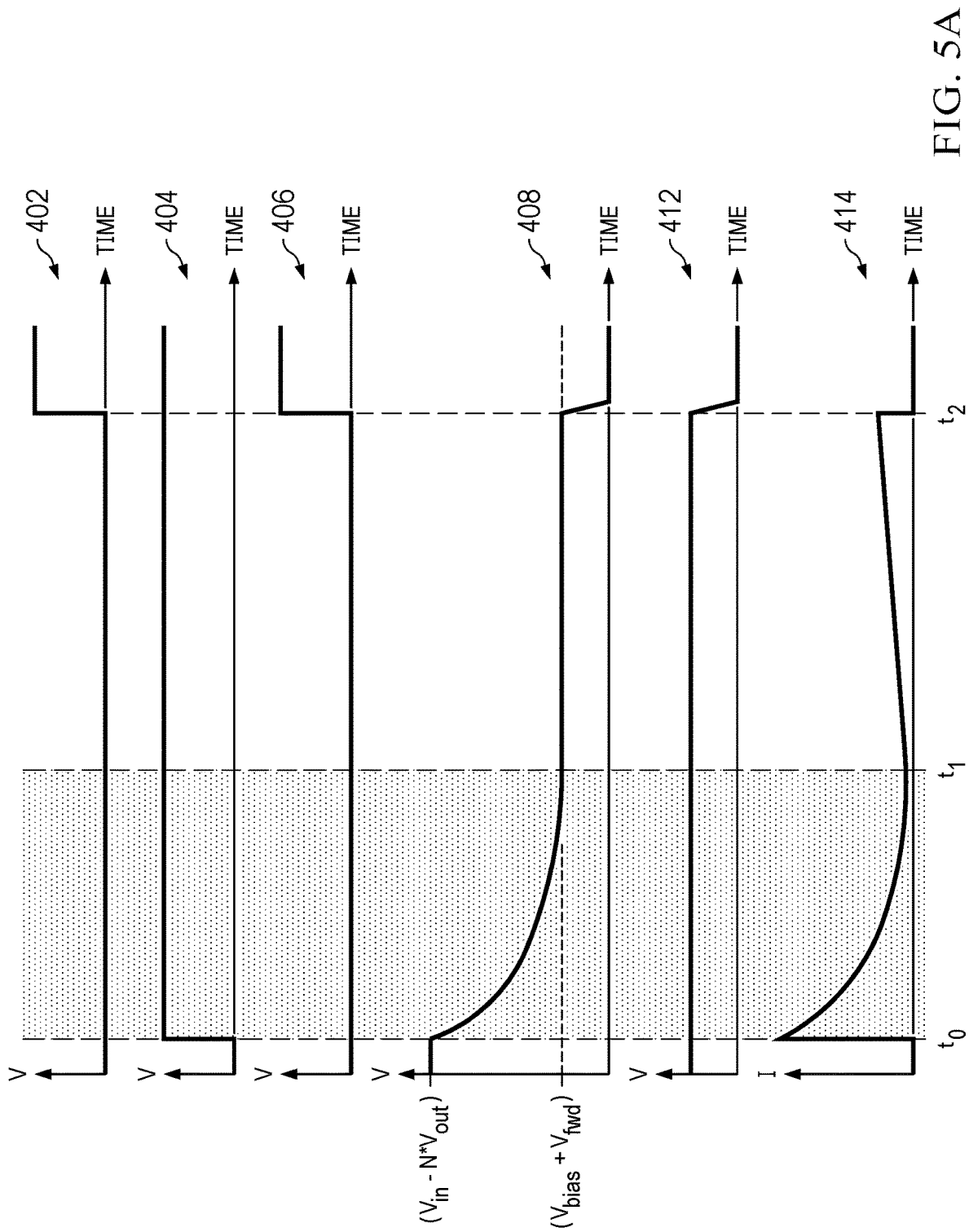
FIGS. 5A and 5B include graphs and schematic that illustrate example operations of the power converter and bias generation circuit of FIGS. 1A-3.
Figure 5B:
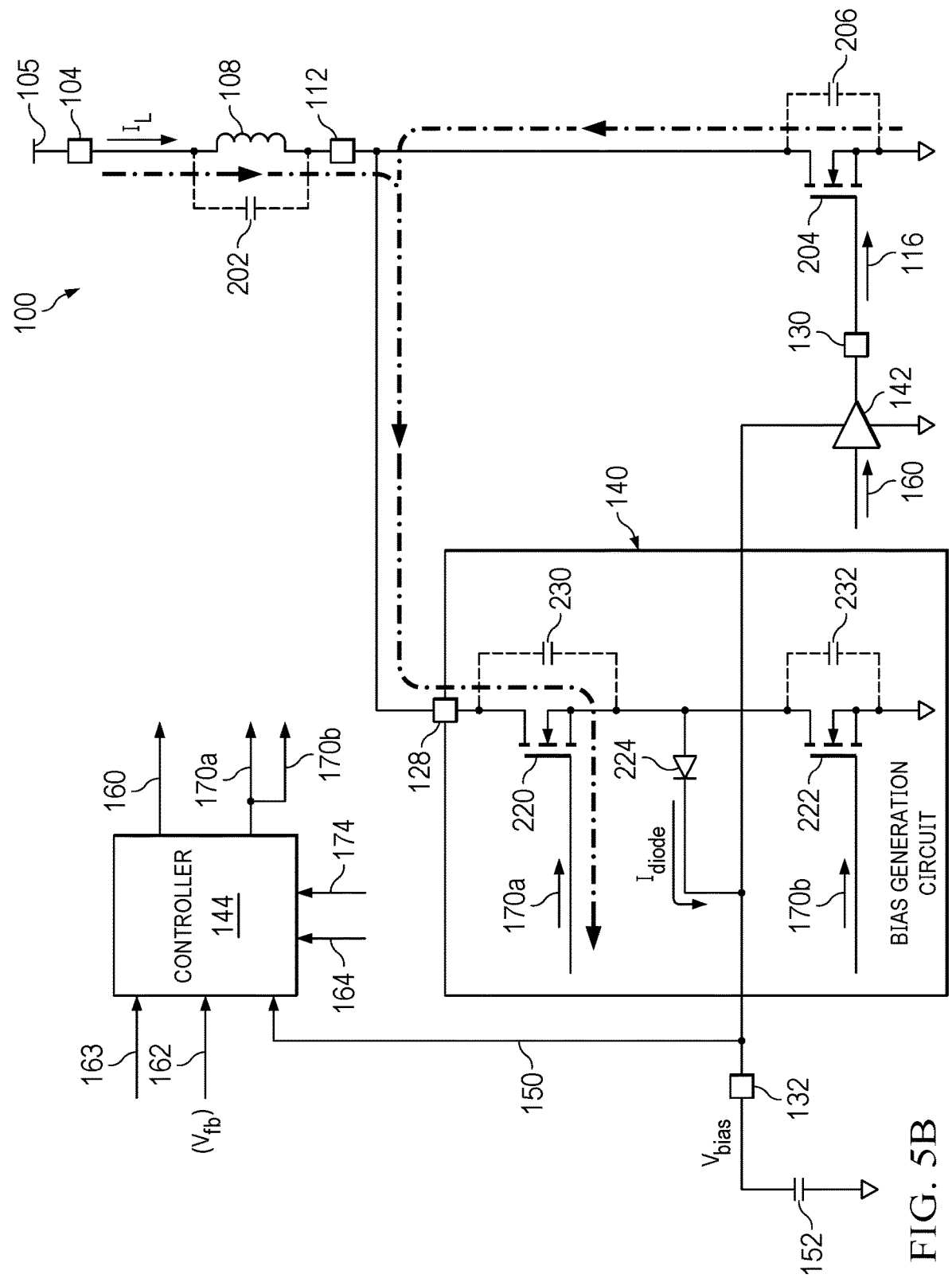

FIG. 5A and FIG. 5B illustrate example operations between times $t_0$-$t_1$. Prior to $t_0$, controller 144 can set control signals 160 (and 116), 170a, and 170b in a low state/off state, and switches/transistors 204, 220, and 222 are also in the off state responsive to the respective control signals 160, 170a, and 170b being in the low state. For example, in a case where transistors 204, 220, and 222 are NFETs, control signals 116, 170a, and 170b can be in a low state such that the gate-source voltages of transistors 204, 220, and 222 are below their respective thresholds.

At $t_0$, controller 144 starts a new switching cycle $T_{sw}$, and transitions the control signal 170a (for transistor 220) from the low state to the high state to start the new switching cycle. Controller 144 can start the new switching cycle at $t_0$ responsive to switching trigger signal 163. As described above, switching trigger signal 163 can be the switching terminal voltage. In a case where the power converter 100 operates in quasi resonant (QR) mode, the voltage at switching terminal 112 at $t_0$ can be $V_{in}$–$N*V_{out}$, where $V_{in}$ is the input voltage at power input terminal 104, $V_{out}$ is the output voltage at power output terminal 106a (or between power output terminals 106a and 106b), and N is a turn ratio of the transformer 109. The voltage can represent a valley of the switching terminal voltage, and controller 144 can start the switching cycle responsive to detecting the valley. Controller 144 can also start the switching cycle at $t_0$ responsive to other switching trigger signal 163, such as a clock signal, a zero current detection signal, a timer signal, etc. Also, in a case where power converter 100 operates in the TM or DCM mode, the current through inductor 108 ($I_L$) can be initially at zero.

Also, controller 144 sets the duty cycle of control signal 170a. Controller 144 may determine the on-time of a switching cycle by comparing the feedback voltage ($V_{fb}$) 162 to the reference voltage 164, and transitions control signal 170a from the high state back to the low state at the end of on-time. As described above, controller 144 terminates a current switching cycle and starts a new switching cycle based on switching trigger signal 163. By setting the cycle period and the on-time of the switching cycle, controller 144 can set the duty cycle of control signal 170a. In some examples, the controller 144 may also extend the off-time and delay the start of a new switching period in extreme light load conditions, where controller 144 may not initiate the new switching period on a first valley detection, but may initiate the new switching period on a subsequent (such as a second or a third) valley detection, as part of a valley-skipping mode operation when the power converter 100 operates in QR mode.

Further, controller 144 also generates control signals 170b and 160 based on control signal 170a. Specifically, controller 144 can delay the transition of control signals 170b and 160 from the low state to the high state with respect to control signal 170a. Controller 144 can also transition control signals 170a, 170b, and 160 from the high state to the low state at the same time based on the on time of control signal 170a.

Specifically, between $t_0$ and $t_1$, the controller 144 sets the control signal 170a (for transistor 220) to the high state, while maintaining the control signals 170b and 160 (for transistors 222 and 204) at the low state. Accordingly, transistor 220 is enabled, and transistors 222 and 204 are disabled. Referring to FIG. 5B, between to and $t_1$, charge stored in the parasitic capacitance 206 of the transistor 204 and the charge stored in the parasitic capacitance 202 of the inductor 108 is redirected into the bias terminal 132 through the transistor 220 and the diode 224 as a current (labelled $I_{diode}$), and the charge can be stored in capacitor 152. Without being diverted to capacitor 152, the charge in the parasitic capacitances would have been lost (e.g., to ground) when transistor 204 is turned on later. By retaining the charge and using the charge to supply power to other circuits (e.g., controller 144, driver 142, etc.), the efficiency of the power converter can be improved. Due to the discharging of the parasitic capacitances, the voltage at switching terminal 112 reduces with time and can settle at a voltage equal to $V_{bias}+V_{fwd}$, where $V_{bias}$ is the voltage at bias terminal 132 and $V_{fwd}$ is the forward voltage of diode 224. The current $I_{diode}$ also reduces with time as the parasitic capacitances discharge. As the voltage across diode 224 drops to close to or below $V_{fwd}$ at t1, the current $I_{diode}$ drops to around zero and the discharge stops.

Figure 6A:
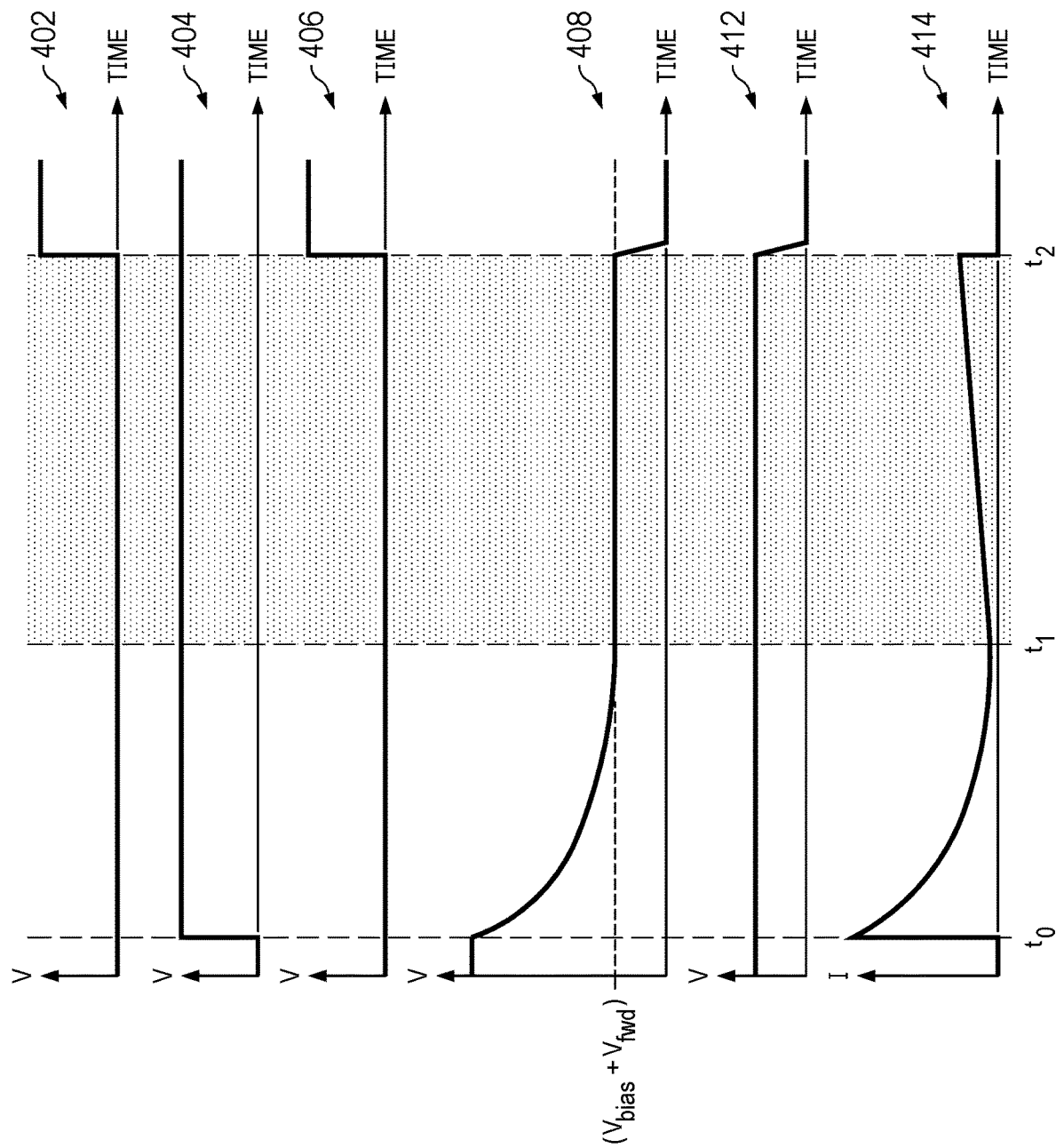
FIGS. 6A and 6B include graphs and schematic that illustrate example operations of the power converter and bias generation circuit of FIGS. 1A-3.
Figure 6B:
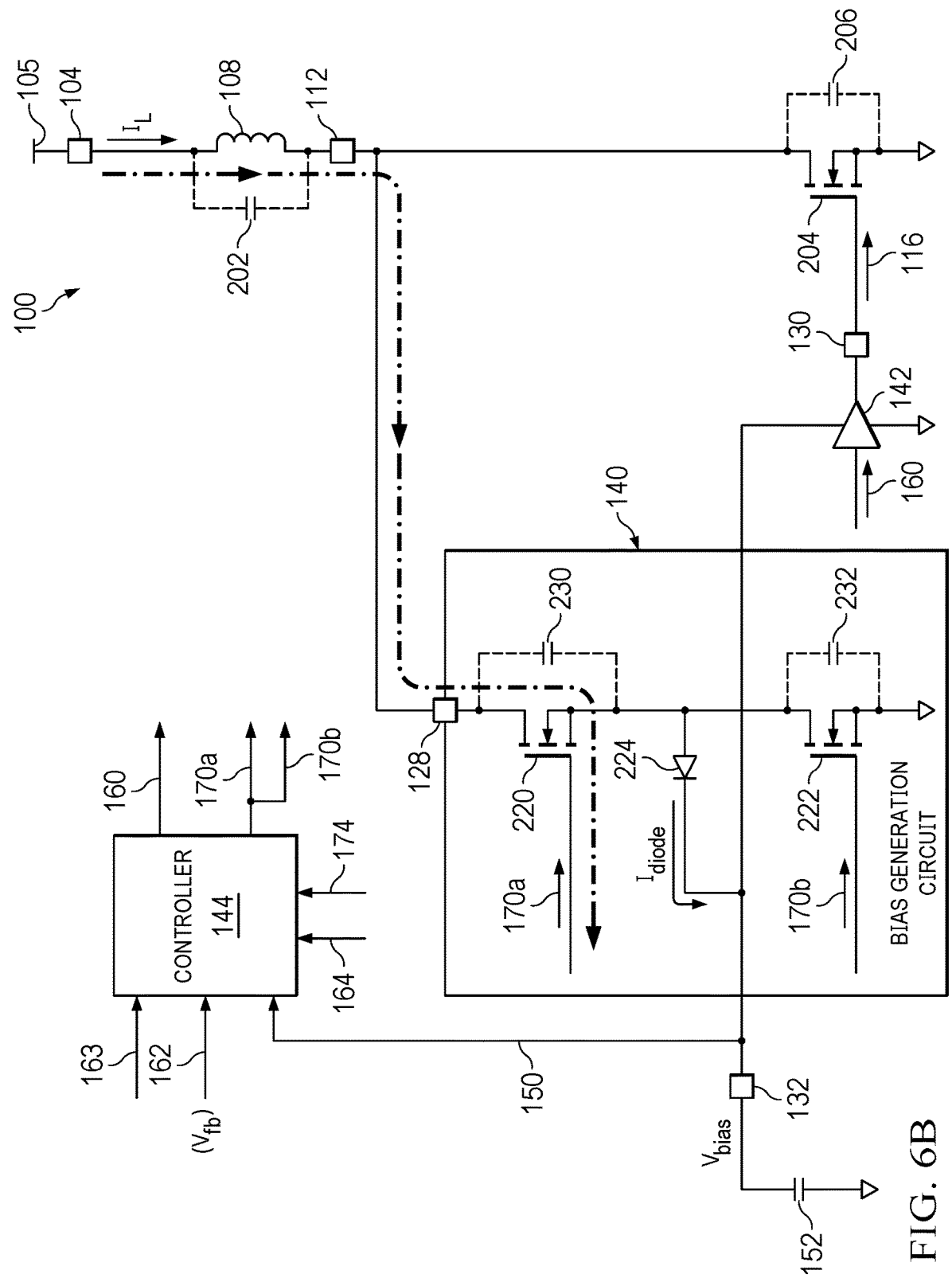

Referring to FIG. 6A and FIG. 6B, between times $t_1$ and $t_2$, controller 144 can maintain control signal 170a in the high state, and control signals 170b and 160 in the low state, so that transistor 220 is enabled and transistors 204 and 222 are disabled. By time $t_1$, the parasitic capacitance 206 of the transistor 204 is substantially discharged, and hence, no current flows from the parasitic capacitance 206 to the bias terminal 132. Also, between t1 and t2, transistor 220 is enabled and provides an electrical connection between input power terminal 104 and bias terminal 132, and inductor 108 experiences a voltage difference $V_{in}-V_{bias}$ across the two ends of the inductor. Inductor 108 (of a primary side coil of transformer 109 or a standalone inductor of a boost converter) can conduct a current $I_L$ that increases at rate of $(V_{in}-V_{bias})/L$ where L is the inductance of inductor 108. The current $I_L$ flows through transistor 220 and the bias terminal 132 to further charge capacitor 152 to the $V_{bias}$ voltage. As to be described below, the charging of capacitor 152 stops at $t_2$ when controller 144 transitions control signals 170b and 160 to the respective high state to enable transistors 204 and 222.

In some examples, controller 144 can set time duration between times $t_1$ and $t_2$ to regulate the bias voltage $V_{bias}$. For example, controller 144 can compare $V_{bias}$ with a reference voltage 174 and, responsive to $V_{bias}$ exceeding reference voltage 174, transitions control signals 170b and 160 to the respective high states to enable transistors 204 and 222 and to stop the charging of capacitor 152. In one example, controller 144 can compare the $V_{bias}$ voltage (which can be an average over several switching cycles) against reference voltage 174, and can set a duration between times $t_1$ and $t_2$ based on the result of the comparison. For example, an average delay is tuned such that the delay period is sufficient for the $V_{bias}$ voltage to meet or exceed the reference voltage 174 over the several switching cycles. Once the delay period is tuned or configured and set, the controller 144 may use the same delay for subsequent switching cycles. At a given switching cycle, after the end of the delay period, at time $t_2$, controller 144 transitions control signals 170b and 160 to the respective high states to enable transistors 204 and 222 and to stop the charging of capacitor 152.

Figure 7A:
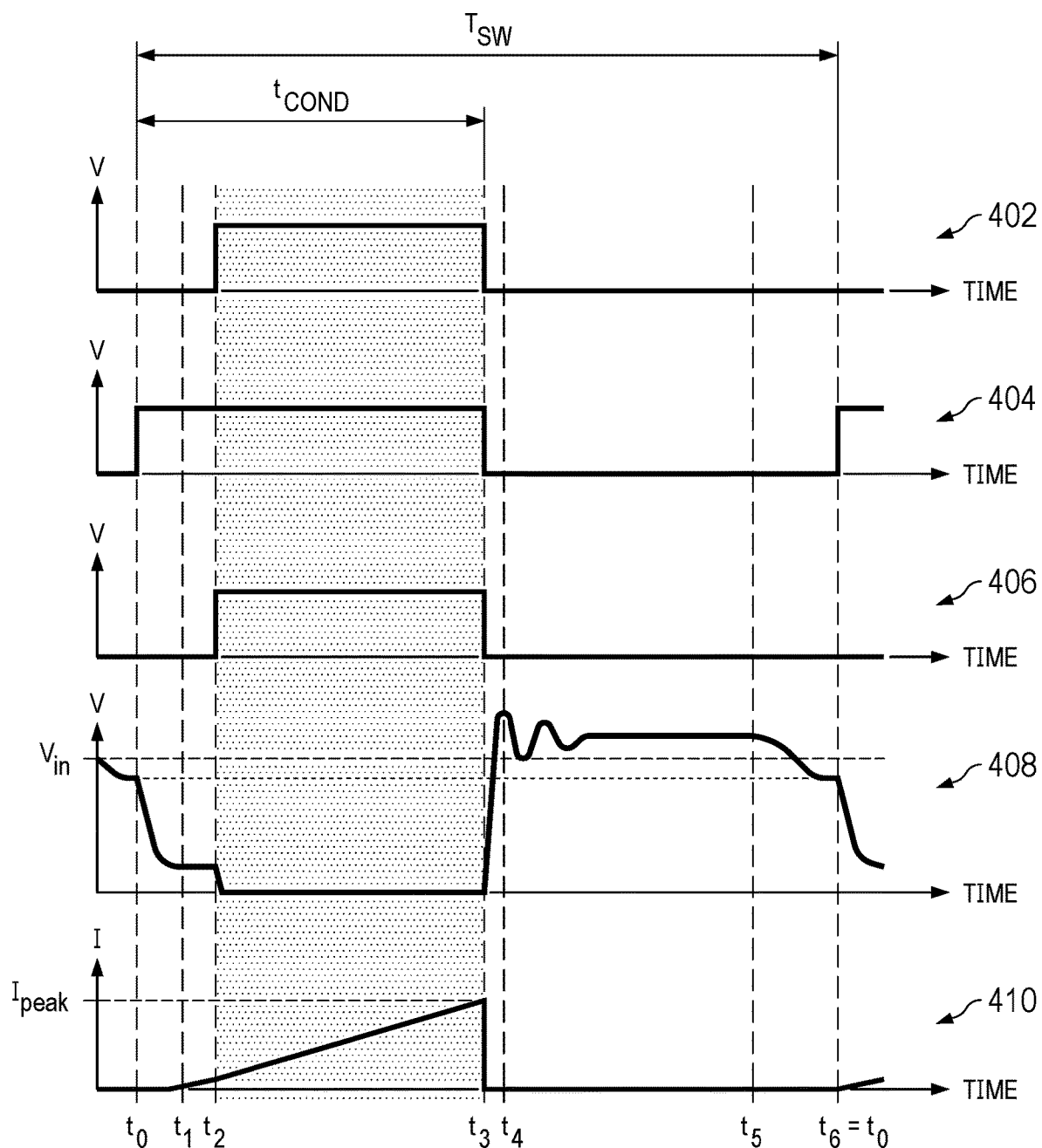
FIGS. 7A and 7B include graphs and schematic that illustrate example operations of the power converter and bias generation circuit of FIGS. 1A-3.
Figure 7B:
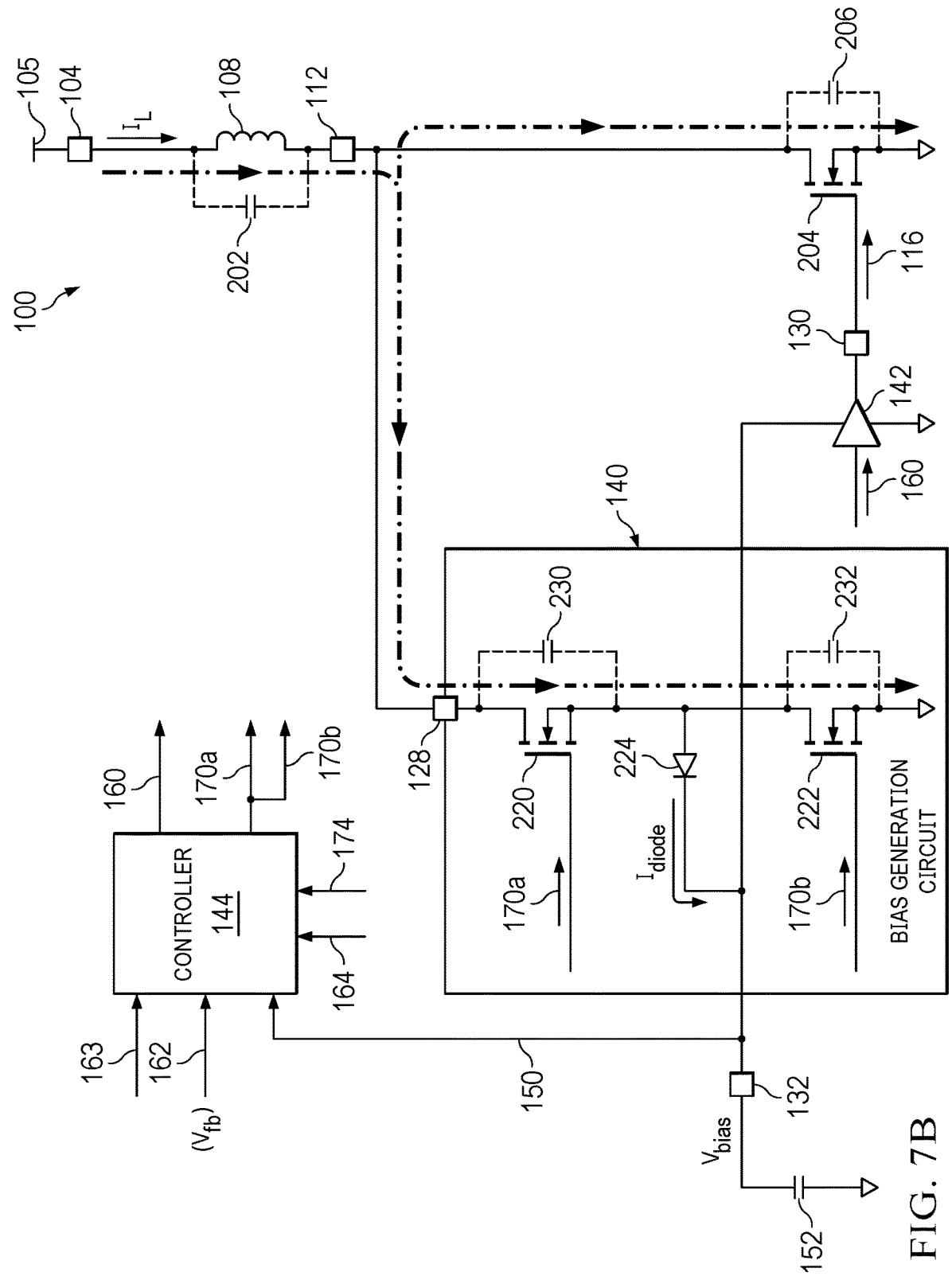

Referring to FIG. 7A and FIG. 7B, at time $t_2$, the controller 144 transitions the control signals 170b and 160 from a low state to a high state, while continuing to maintain the control signal 170a at the high state. The interval between $t_2$-$t_3$ can be an on time of the power converter 100. Between $t_2$ and $t_3$, transistors 204, 220, and 222 are enabled, switching terminal 112 can be connected to ground, and the voltage at switching terminal 112 can be at or close to the ground voltage (0 V). The inductor current $I_L$ increases at a rate $V_{in}/L$, and magnetic energy is stored in the inductor 108. In a case where the power converter 100 is a boost converter, the controller 144 can set the duration between $t_2$ and $t_3$ based on a target output voltage (e.g., based on comparing feedback voltage 162 and reference voltage 164). Referring again to FIGS. 1A and 1B, during the on time of power converter 100, diode 122 can block a current from flowing from load 107 into the secondary side coil 120 (for a flyback converter) or into inductor 108 (for a boost converter), and capacitor 124 can provide power to load 107. The on time ends at $t_3$, when controller 144 transitions control signals 160, 170a, and 170b to the respective low state.

Figure 8A:
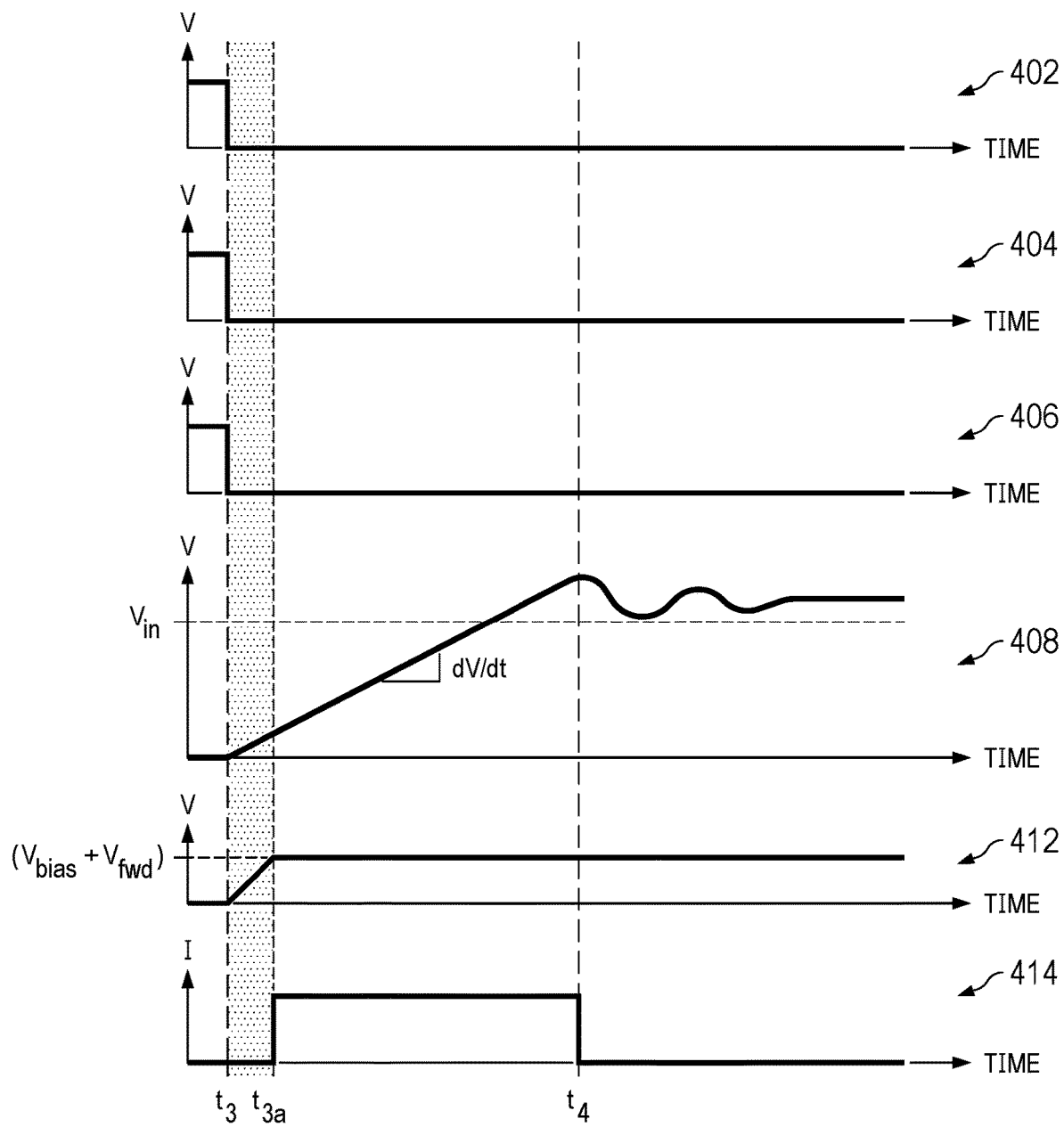
FIGS. 8A and 8B include graphs and schematic that illustrate example operations of the power converter and bias generation circuit of FIGS. 1A-3.
Figure 8B:
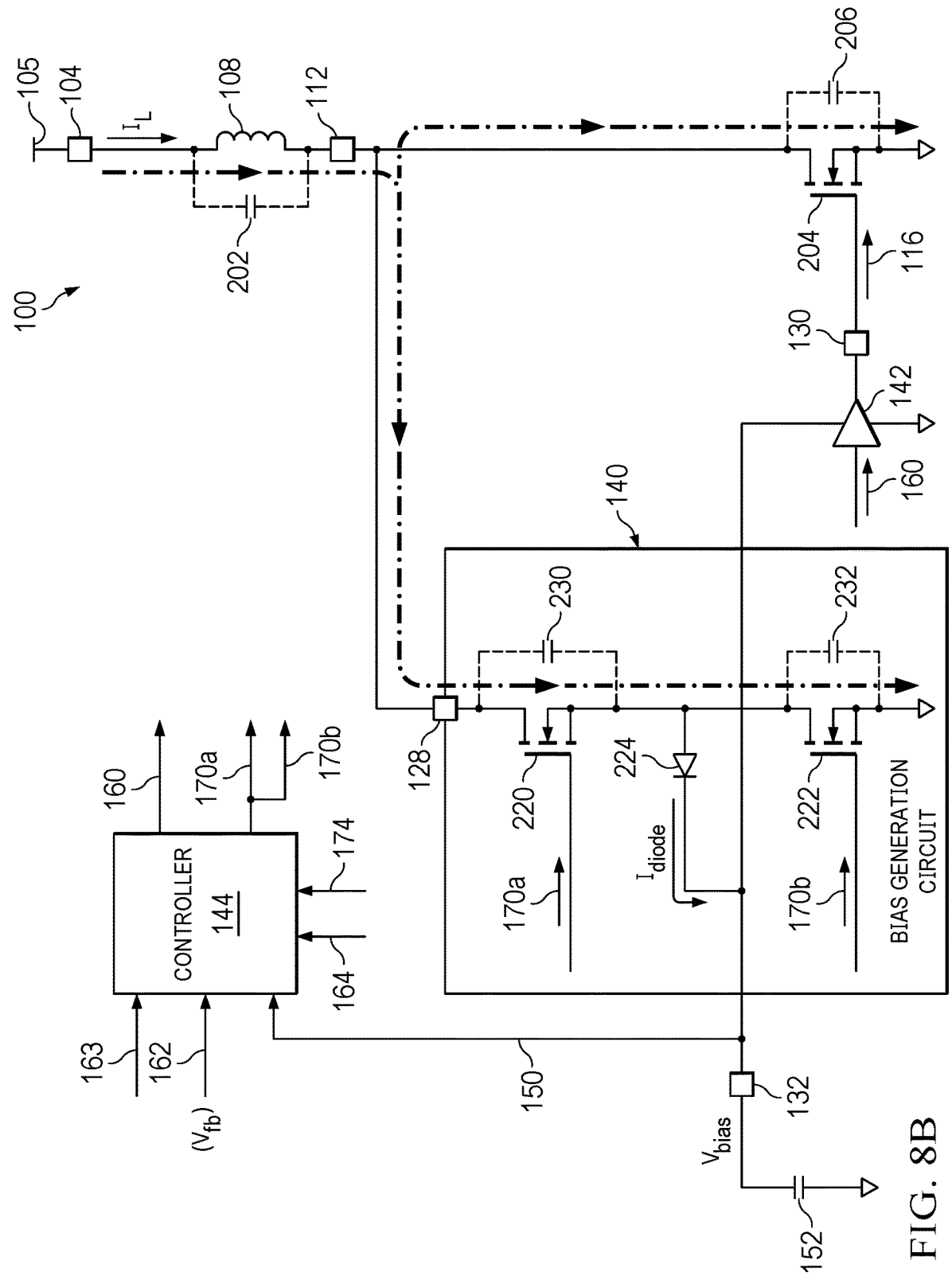

Referring to FIGS. 8A and 8B, between times $t_3$ and $t_{3a}$, controller 144 sets control signals 160, 170a, and 170b to the respective low state, and transistors 204, 220, and 222 are disabled, which starts the off time of the power converter. The inductor 108 can discharge, and the inductor current $I_L$ can charge the Coss parasitic capacitances of transistors 204, 220, and 222 (represented by capacitors 206, 230, and 232). Also, because the charging of the parasitic capacitances, the voltage of switching terminal 112 increases. But between t3 and t3a, before the voltage of switching terminal 112 is relatively low compared with the $V_{bias}$ voltage at bias terminal 132, and the voltage across diode 224 is below the forward voltage $V_{fwd}$. Accordingly, the diode current $I_{diode}$ is at zero.

Figure 9A:
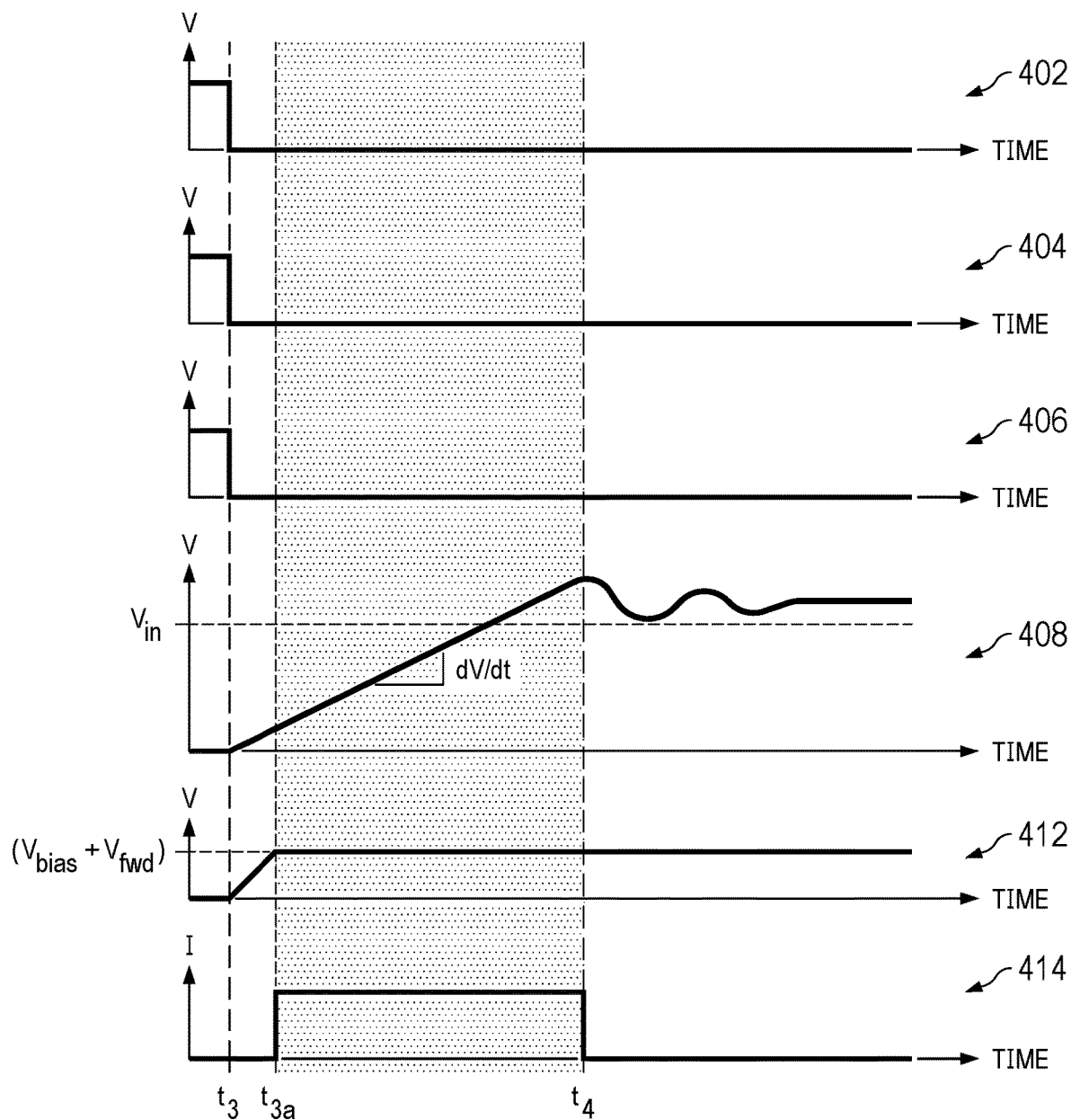
FIGS. 9A and 9B include graphs and schematic that illustrate example operations of the power converter and bias generation circuit of FIGS. 1A-3.
Figure 9B:
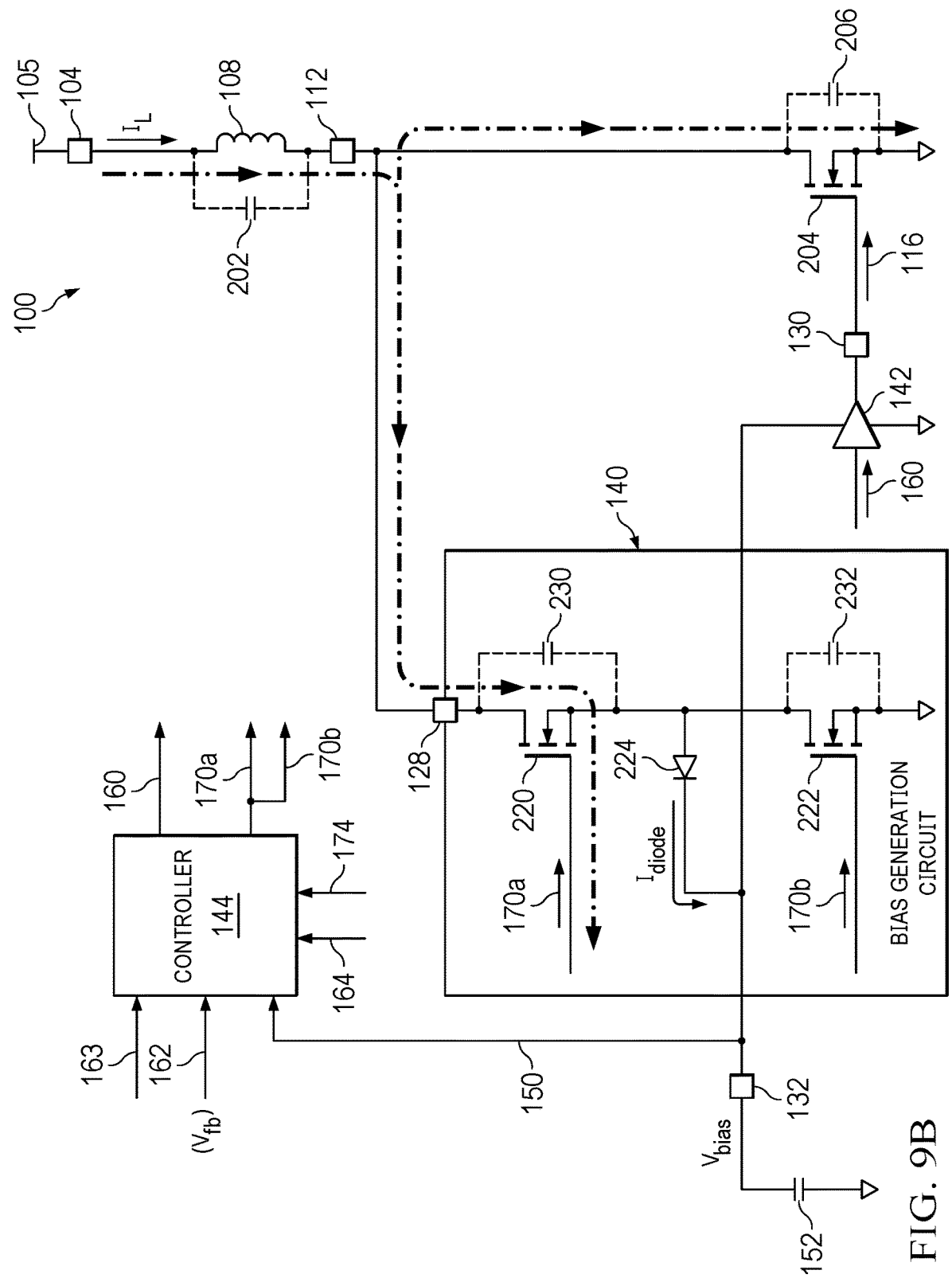

Referring to FIGS. 9A and 9B, at time $t_3a$, as the voltage at switching terminal 112 continues increasing at a rate dV/dt, the voltage across diode 224 exceeds the forward voltage $V_{fwd}$, and diode 224 starts conducting. In some examples, the voltage at the switching terminal 112 can be equal to $2*(V_{bias}+V_{fwd})$ for the voltage across diode 224 to be equal to $V_{fwd}$. Between t3a and t4, some of the inductor current that flows through the parasitic capacitance Coss of transistor 220 (capacitor 230) can be directed to bias terminal 132 through diode 224 to charge capacitor 152, represented by the non-zero $I_{diode}$ in FIG. 9A. The $I_{diode}$ current can be given by a product of dV/dt (a rate of voltage change at the switching terminal 112) and the parasitic capacitance Coss of transistor 220. By diverting at least some of the charge in the parasitic capacitances in power converter 100 (created by the discharging of inductor 108) into capacitor 152 to supply power to other circuits (e.g., controller 144 and driver 142), the amount of parasitic charge lost during the switching of power converter 100 can be reduced, and the efficiency of power converter 100 can be improved.

Figure 10A:
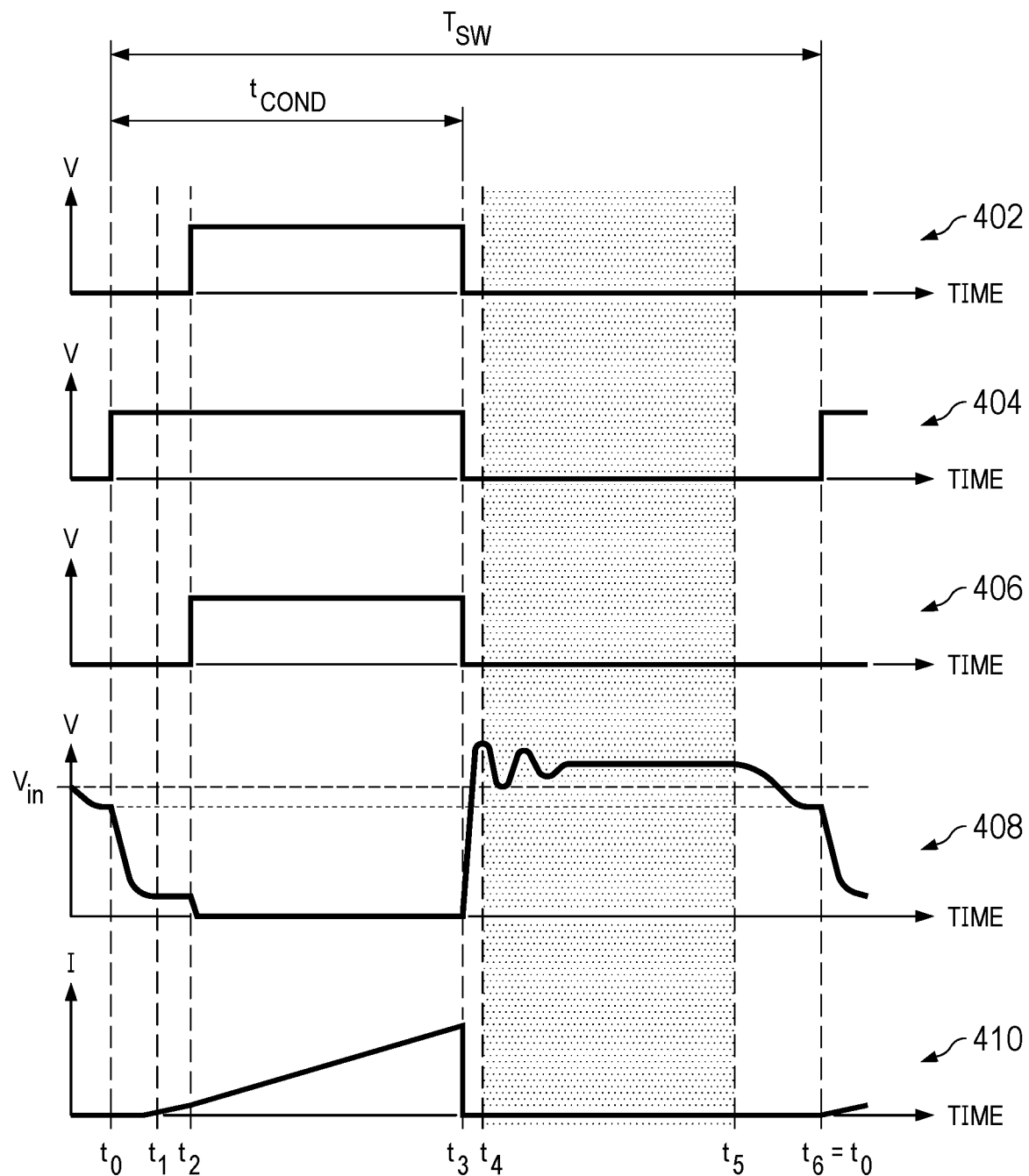
FIGS. 10A and 10B include graphs and schematic that illustrate example operations of the power converter and bias generation circuit of FIGS. 1A-3.
Figure 10B:
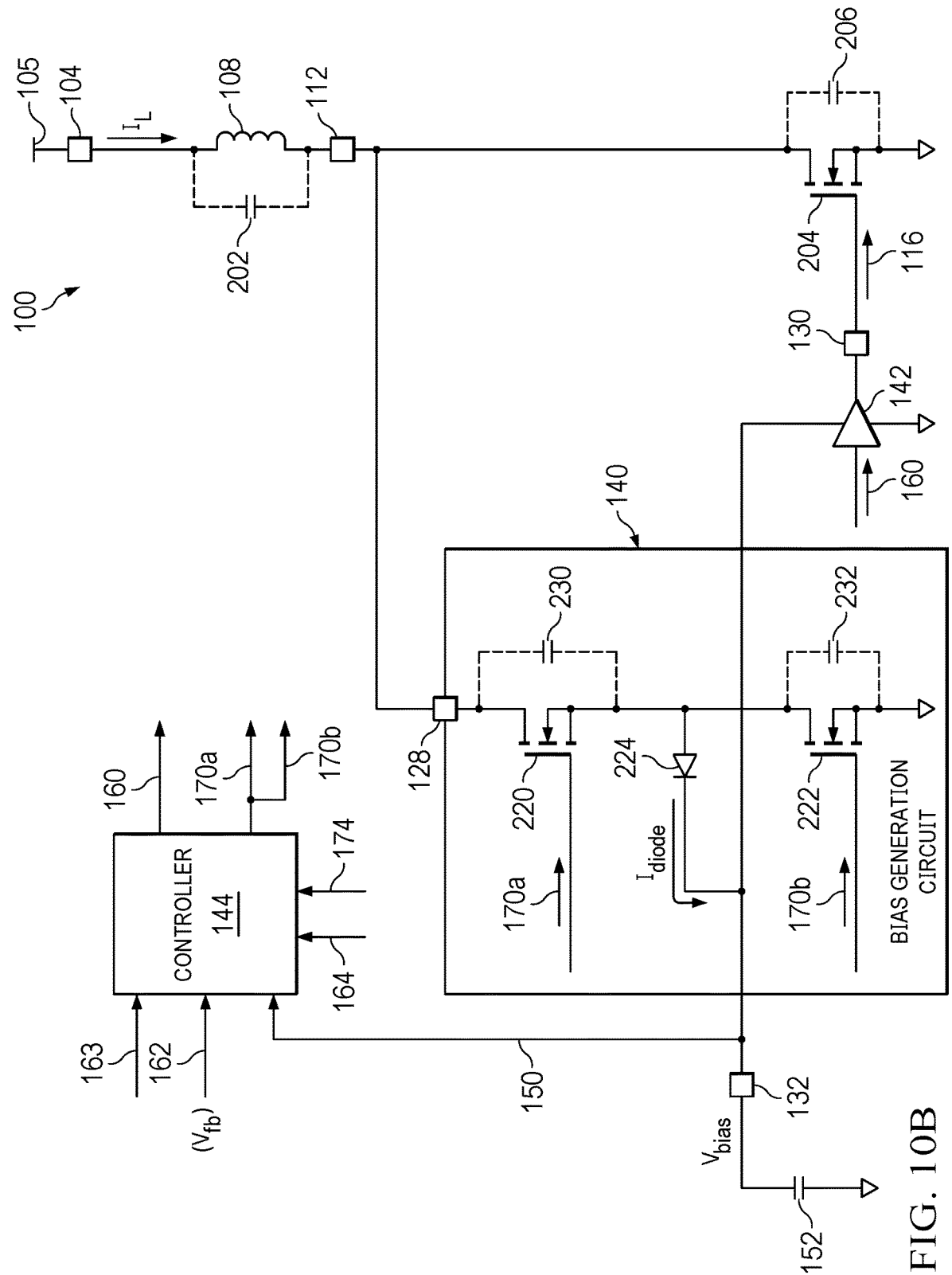

Referring to FIGS. 10A and 10B, at $t_4$, the voltage at switching terminal 112 reaches a peak, and the dV/dt (e.g., change in voltage at switching terminal 112 with time) across the parasitic capacitor 230 of the transistor 220 becomes zero, so that current stops flowing through the capacitor and $I_{diode}$ becomes zero. In a case where the power converter is a flyback converter, between t4 to t5, the voltage at switching terminal 112 settles at $(V_{in}+N*V_{out})$, where N is the transformer winding ratio. At time $t_5$, the current on the secondary side coil becomes substantially zero before start of a new switching cycle.

Figure 11A:
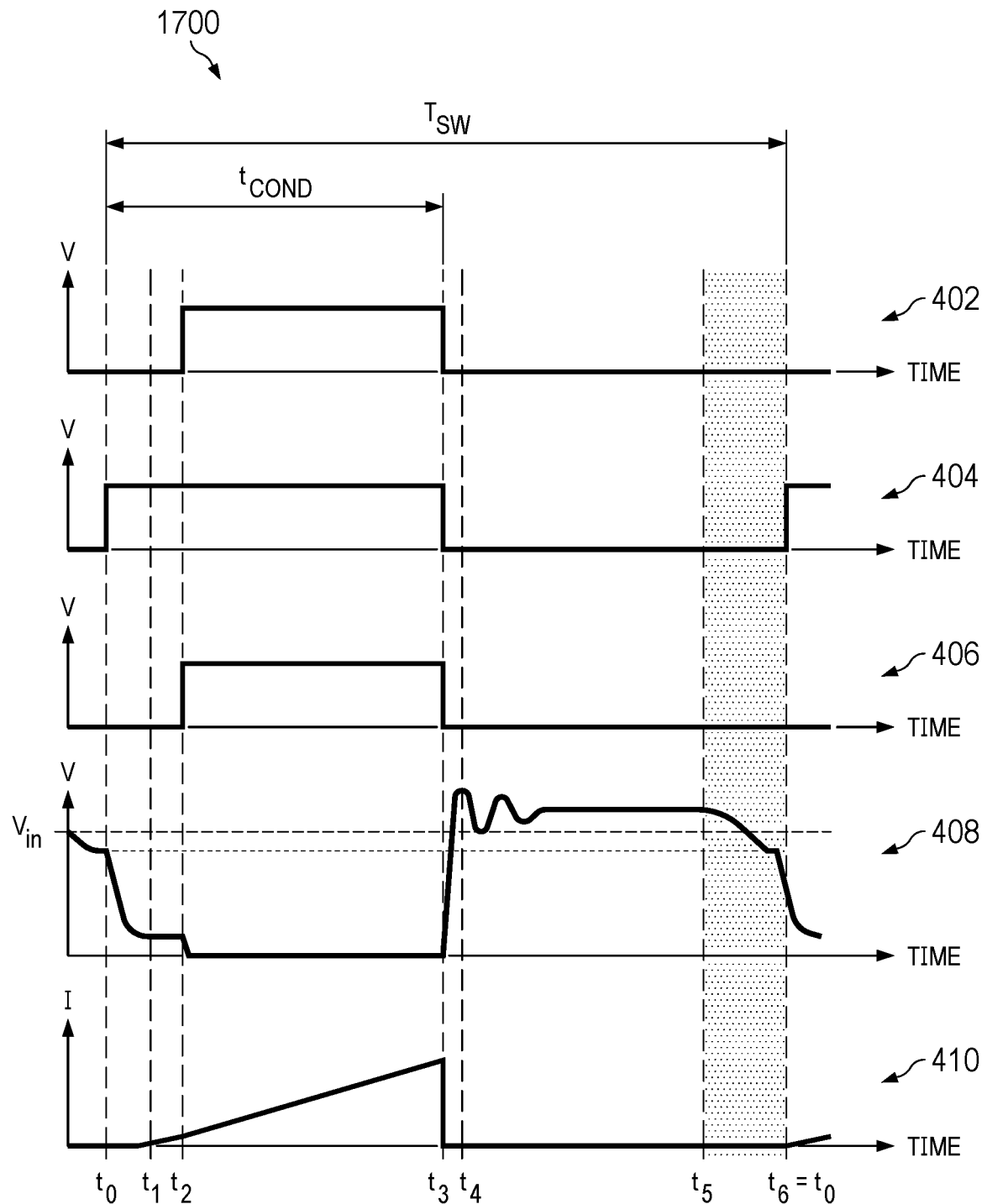
FIGS. 11A and 11B include graphs and schematic that illustrate example operations of the power converter and bias generation circuit of FIGS. 1A-3.
Figure 11B:
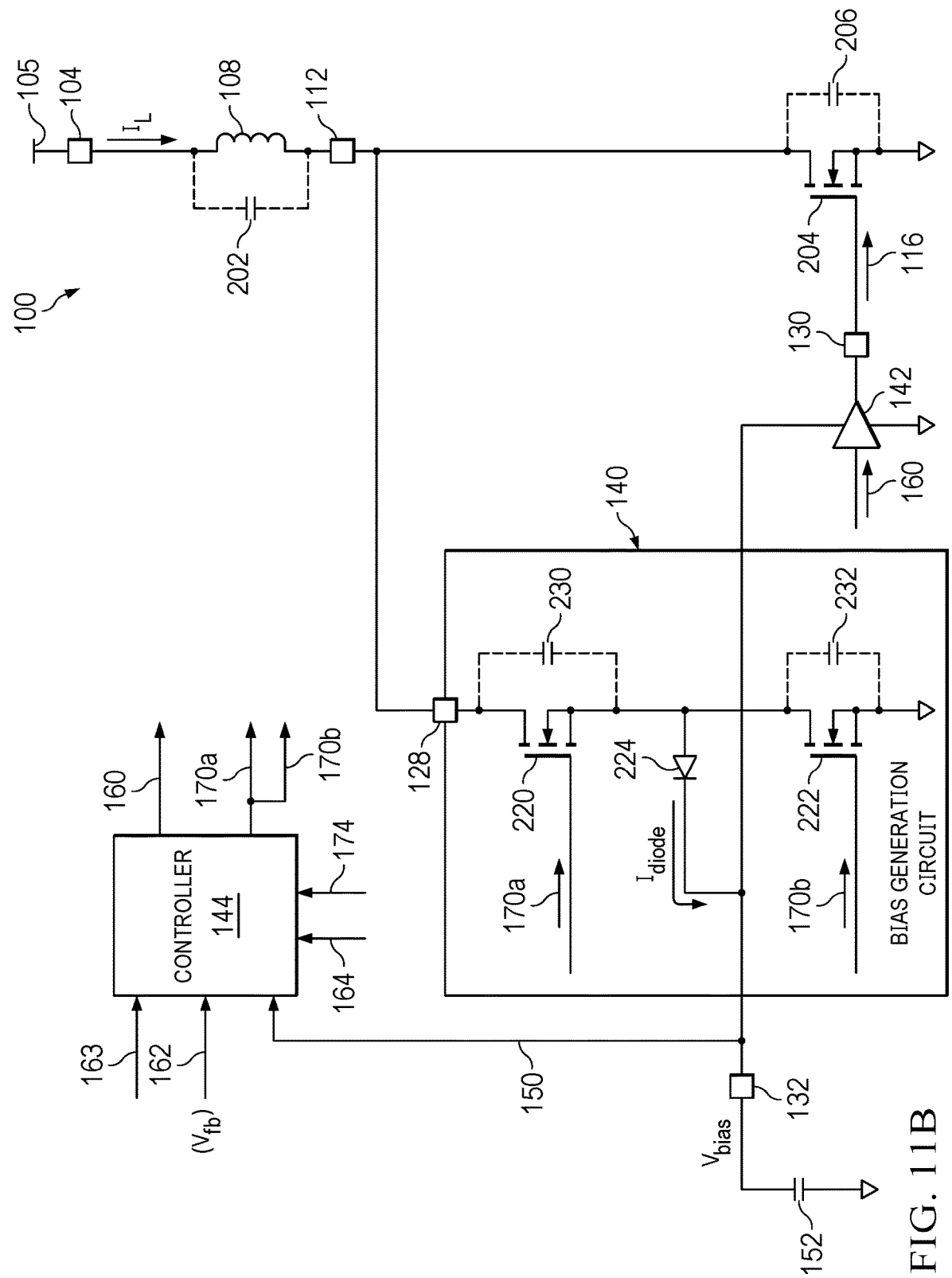

Also, referring to FIGS. 11A and 11B, at time $t_5$, the transformer 109 is fully demagnetized (e.g., stored energy is substantially depleted, and primary and secondary side currents are zero). In an example, the parasitic capacitances at switching terminal 112 may resonate with inductor 108, and due to the resonance the voltage at switching terminal 112 can drop from $(V_{in}+N*V_{out})$ to $(V_{in}-N*V_{out})$. Responsive to the voltage at switching terminal 112 falling to or close to $V_{in}-N*V_{out}$ (e.g., based on the voltage at the switching terminal reaching the valley), controller 144 can start a new switching cycle as described above. In some examples, controller 144 can a start a new switching cycle based on other switching trigger signals 163, as described above.

In addition to diverting some of the parasitic charge in power converter 100 to capacitor 152 to generate a bias, transistors 220 and 222 of bias generator circuit 140 can also reduce amount of inductor current to be conducted by the transistor 204 (switch 114) during the on time of power converter 100. As described above, between $t_2$-$t_3$ where inductor 108 is charged to store magnetic energy, transistors 220, 222, and 204 are turned on, and the inductor current is split between transistor 204 and transistors 220/222. Because of the reduction of current through transistor 204, the size of transistor 204 can be shrunk. In a case where transistor 204 includes devices that tolerate a high voltage, such arrangements can reduce the footprint of the semiconductor die (e.g., semiconductor die 304) that includes transistor 204. On the other hand, transistor 222 can include devices that tolerate a relatively low voltage and have a much smaller footprint than transistor 204. All these can reduce the overall footprint of a system (e.g., integrated circuit 300) that includes switch 114 and control circuit 102.

Figure 12:
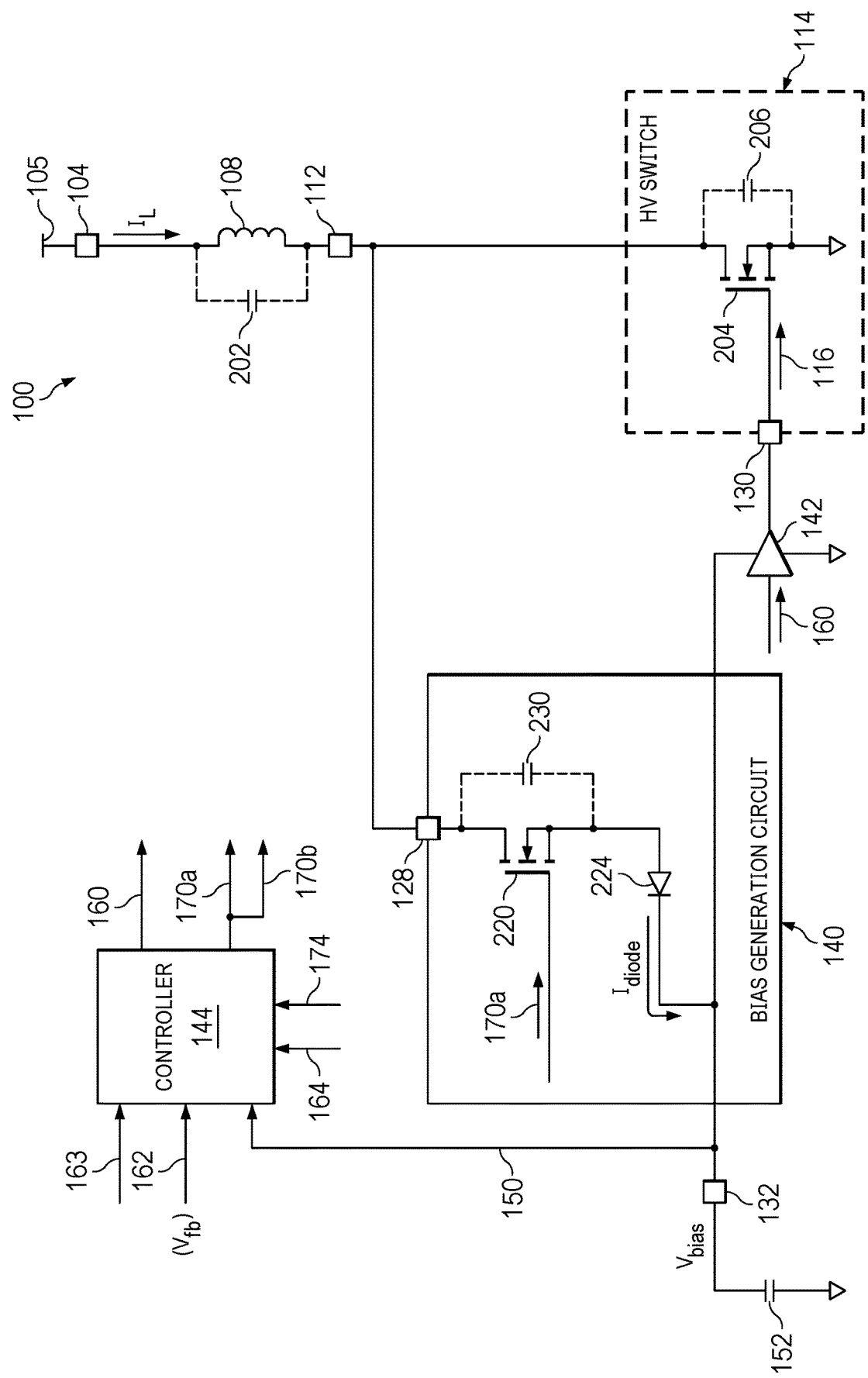
FIG. 12 is a schematic illustrating example internal components of the power converter and bias generation circuit of FIGS. 1A-3.

In some examples, transistor 222 can be omitted in bias generation circuit 140. FIG. 12 illustrates an example bias generation circuit 140 in which transistor 222 is omitted.

Figure 13A:
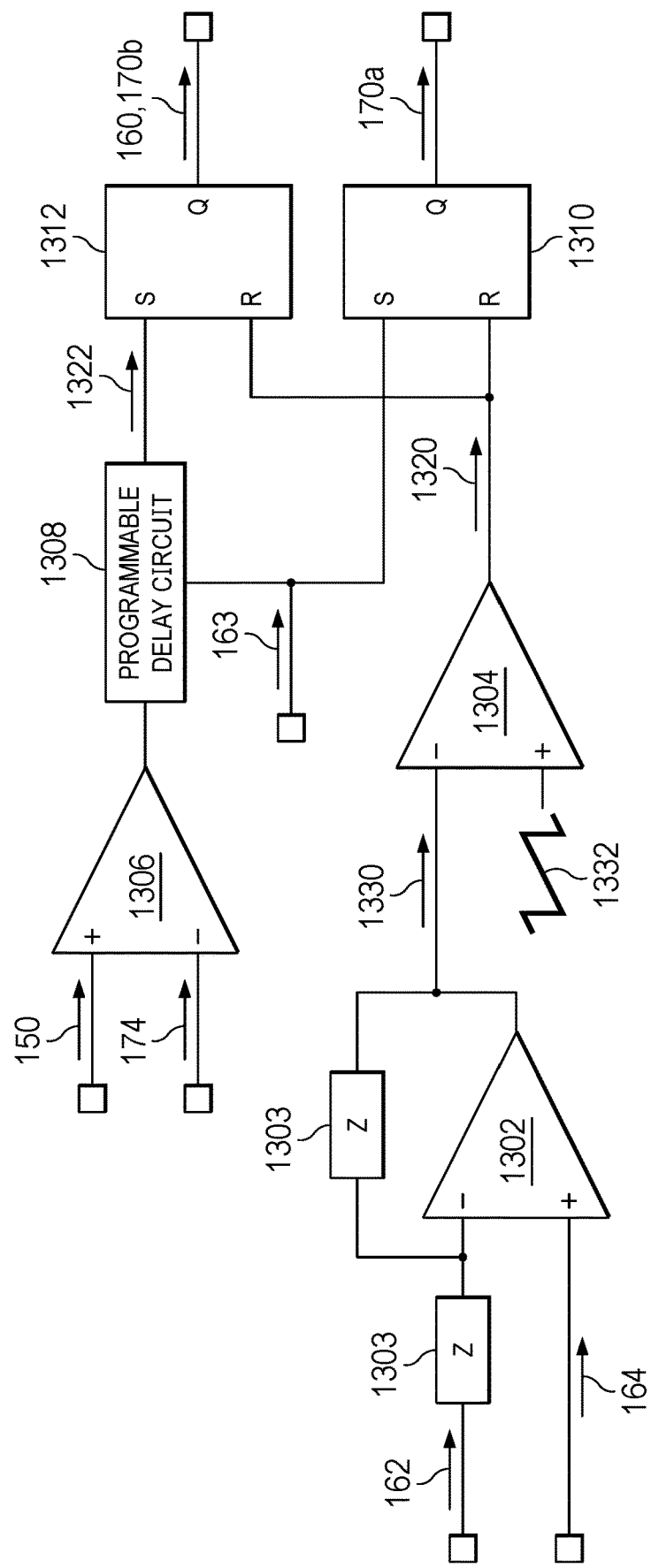
FIGS. 13A and 13B are schematics illustrating example internal components of a controller of the power converter and bias generation circuit of FIGS. 1A-12.
Figure 13B:
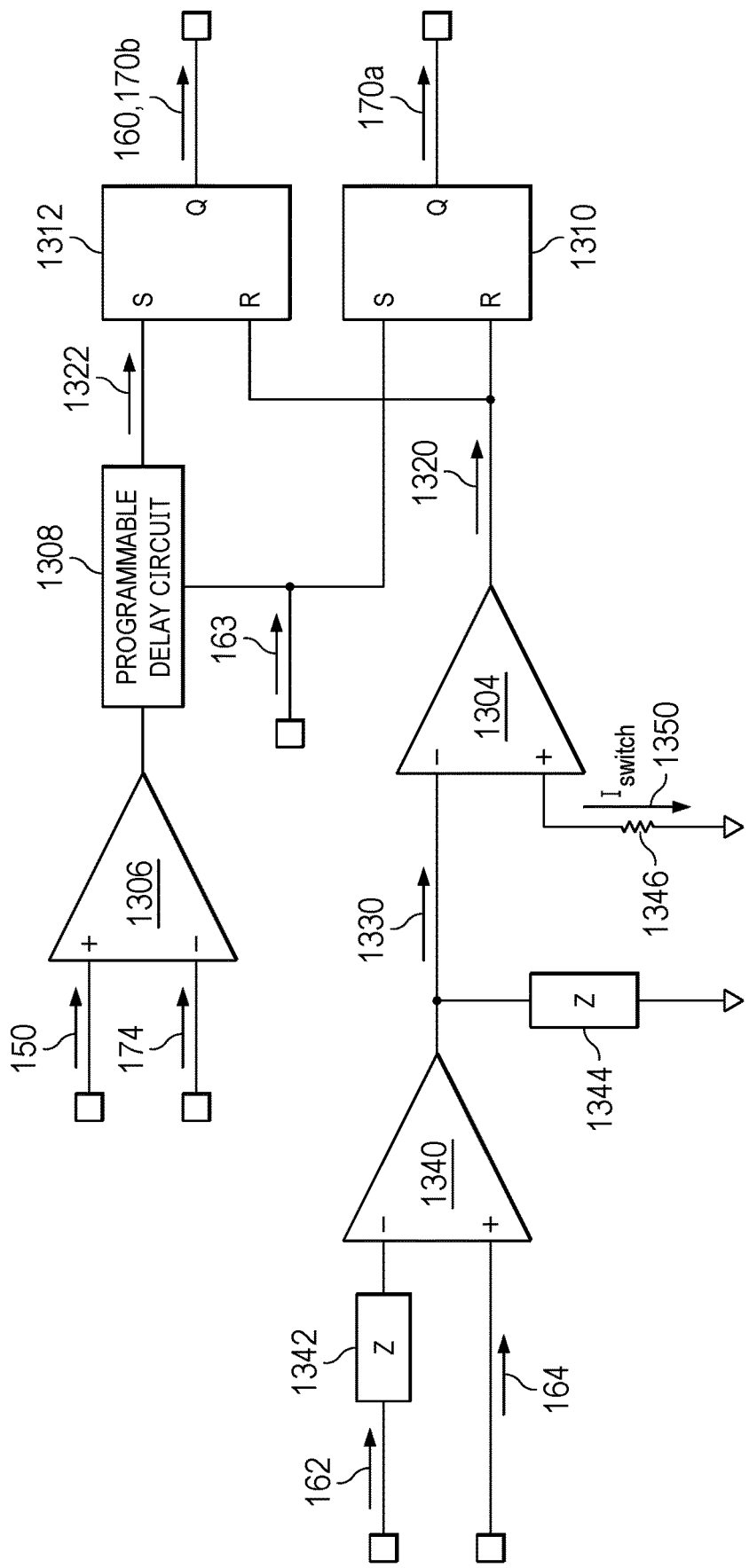

FIG. 13A and FIG. 13B illustrate example internal components of controller 144 of FIGS. 1A-12. Referring to FIG. 13A, controller 144 can implement a voltage mode control scheme. Controller 144 can include an operational amplifier (opamp) 1302 with feedback network 1303, a comparator 1304, an amplifier 1306, a programmable delay circuit 1308, and timing circuits (e.g., S-R latches) 1310 and 1312. Timing circuit 1310 can generate control signal 170a as a multicycle pulse width modulation (PWM) signal. Timing circuit 1310 can receive switching trigger signal 163 and transition control signal 170a from the low state to the high state responsive to switching trigger signal 163. Also, timing circuit 1310 can receive a reset signal 1320, which ends the on time of a switching cycle of control signal 170a, and transition control signal 170a from the high state to the low state responsive to the reset signal 1320. Timing circuit 1312 can also generate control signals 160 and 170b. Timing circuit 1312 can receive a switching trigger signal 1322 which is a delayed version of switching trigger signal 163 from programmable delay circuit 1308, and start the transition of control signals 160 and 170b from the low state to the high state responsive to switching trigger signal 1322. Timing circuit 1312 can also end the on time of a switching cycle of control signals 160 and 170b responsive to reset signal 1320.

Controller 144 generates reset signal 1320 using opamp 1302, feedback network 1303, and comparator 1304. Specifically, opamp 1302 and feedback network 1303 can form an error amplifier. The error amplifier can receive feedback voltage 162 (e.g., representing the voltage at output power terminals 106a/b, etc.) and reference voltage 164 (e.g., which may be a constant DC voltage, in an example), and generate an error signal 1330 based on a difference between feedback voltage 162 and reference voltage 164. Comparator 1304 can compare error signal 1330 with a sawtooth signal 1332 to generate reset signal 1320 when the comparator trips. The timing of reset signal 1320 can set the duration of the on time, which reflects the difference between feedback voltage 162 and reference voltage 164 represented by error signal 1330. For example, if the magnitude of error signal 1330 increases, the tripping of comparator 1304 can be delayed, and reset signal 1320 can also be delayed, which increases the on time of control signals 160, 170a, and 170b. On the other hand, if the magnitude of error signal 1330 decreases, the tripping of comparator 1304 and reset signal 1320 can be pulled in, and the on time of control signals 160, 170a, and 170b can be reduced.

Further, amplifier 1306 can generate an error signal 1330 based on a difference between the $V_{bias}$ voltage of bias signal 150 and reference voltage 174, and provide error signal 1330 to programmable delay circuit 1308. Programmable delay circuit 1308 can set the delay between switching trigger signals 163 and 1322, including the duration between $t_1$ and $t_2$, based on error signal 1330. For example, if error signal 1330 indicates that the $V_{bias}$ voltage of bias signal 150 is lower than reference voltage 174, programmable delay circuit 1308 can decrease the delay. Also, if error signal 1330 indicates that the $V_{bias}$ voltage of bias signal 150 is higher than reference voltage 174, programmable delay circuit 1308 can increase the delay.

FIG. 13B illustrates another example of controller 144. In FIG. 13B, controller 144 can implement a current mode control scheme. Controller 144 can include a transconductance amplifier 1340, an input impedance network 1342, and output impedance network 1344, and a current sense device (e.g., resistor) 1346. Transconductance amplifier 1340 and impedance networks 1342 and 1344 can form an error amplifier. The error amplifier can receive feedback voltage 162 (e.g., representing the voltage at output power terminals 106a/b, etc.) and reference voltage 164 (e.g., which may be a constant DC voltage, in an example), and generate an error signal 1330 based on a difference between feedback voltage 162 and reference voltage 164. Also, comparator 1304 receives a current sense signal 1350 representing a current flowing in the power converter, such as a current at inductor 108 or transformer 109, and generate reset signal 1320 based on comparing current sense signal 1350 with error signal 1330. Current sense signal 1350 can be sawtooth form and starts increasing in amplitude when a new switching cycle starts.

In some examples, various components of controller 144 can also be implemented in any suitable circuit or component capable of performing processing and/or control, such as a processor, microprocessor, controller, microcontroller, field-programmable gate array (FPGA), or any other combination of analog and/or digital components arranged in an architecture that provides processing and control capabilities.

Figure 14:
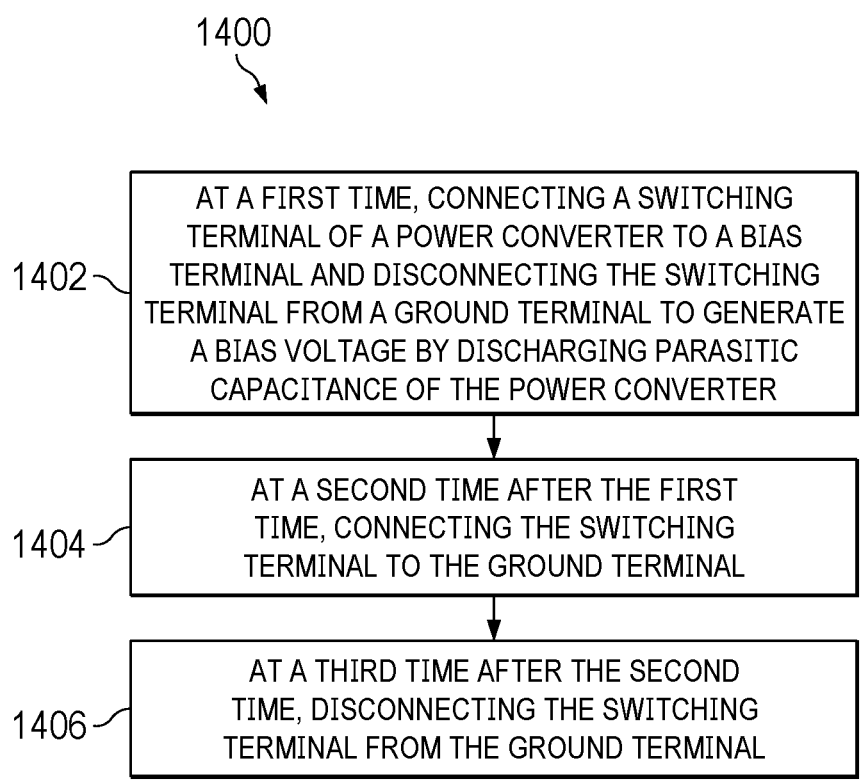
FIG. 14 is a flowchart illustrating an example method of controlling a power converter.

FIG. 14 illustrates a flowchart of an example method 1400 of controlling a power converter, such as power converter 100 of FIG. 1A and FIG. 1B. Method 1400 can be performed by, for example, controller 144 in conjunction with bias generation circuit 140 and switch 114.

In operation 1402, controller 144 can connect a switching terminal of a power converter to a bias terminal to generate a bias voltage by discharging parasitic capacitance of the power converter. Specifically, referring to FIGS. 5A and 5B, and FIGS. 6A and 6B, controller 144 can enable transistor 220 to connect switching terminal 112 to bias terminal 132. Charge stored in the parasitic capacitances of inductor 108 and switch 114 can be diverted to capacitor 152 via bias terminal 132 to generate the $V_{bias}$ voltage. Controller 144 can enable transistor 220 responsive to switching trigger signal 163 to start a new switching cycle.

In operation 1404, after a configurable amount of delay (where the delay period initiates at connecting the switching terminal 112 to the bias terminal 132), controller 144 can connect the switching terminal to a ground terminal. Specifically, referring to FIGS. 7A and 7B, controller 144 can compare the $V_{bias}$ voltage (e.g., an average of the $V_{bias}$ voltage over several switching cycles) against reference voltage 174, and can tune the delay. For example, the delay is tuned such that the delay period is sufficient for the $V_{bias}$ voltage to meet or exceed the reference voltage 174. Once the delay period is tuned, the controller 144 may use the same delay for subsequent switching cycles. At a given switching cycle, after the end of the delay period, controller 144 can enable switch 114 to connect the switching terminal 112 to ground to charge inductor 108 with magnetic energy. Referring to FIGS. 8A and 8B, operation 1404 can be part of the on time of the power converter, and the on time can also be set by the controller 144 as part of the output voltage regulation as described above.

In operation 1406, controller 144 can disconnect the switching terminal from the ground terminal. Referring to FIGS. 8A and 8B and FIGS. 9A and 9B, controller 144 can disable transistor 204 to disconnect the switching terminal 112 from the ground terminal, which allows the inductor to discharge. Simultaneously with disabling the transistor 204, controller 144 may also disable the transistors 220 and 222, to disconnect the switching terminal 112 from the bias terminal 132 and the ground terminal. The disabling of transistors 204, 220, and 222 can be responsive to end of on time of the power converter. As described above, controller 144 can determine the on time of the power converter based on a voltage mode, a current mode control scheme, or any other suitable control scheme, and based on a difference between feedback voltage 162 ($V_{fb}$) and a first reference voltage 164.

Referring to FIGS. 9A and 9B, during the initial stage of the discharging, as the voltage of switching terminal 112 increases above $V_{bias}$ by the forward voltage $V_{fwd}$ of diode 224, some of the inductor current can flow through the parasitic capacitance of transistor 220 and diode 224 to charge capacitor 152, thereby diverting the current charging the parasitic capacitance of transistor 220 into capacitor 152. Referring to FIGS. 10A and 10B, after the switching terminal voltage reaches peak, the current stops flowing through the parasitic capacitance of transistor 220, and the charging of capacitor 152 stops.

Further Examples

Example 1. An apparatus, comprising: a first transistor coupled between an inductor terminal and a ground terminal, the first transistor having a first control terminal; a second transistor coupled between the inductor terminal and a bias terminal, the second transistor having a second control terminal, in which the first and second transistors are configured to split a current at the inductor terminal; and a controller having first and second control outputs, the first control output coupled to the first control terminal, the second control output coupled to the second control terminal.

Example 2. The apparatus of example 1, further comprising a diode coupled between a first current terminal of the second transistor and the bias terminal.

Example 3. The apparatus of any one of examples 1-2, further comprising: a capacitor coupled between the bias terminal and the ground terminal.

Example 4. The apparatus of any one of examples 1-3, further comprising a third transistor coupled between the second transistor and the ground terminal, the third transistor having a third control terminal coupled to the first control output.

Example 5. The apparatus of any one of examples 1-4, wherein the controller has a feedback input coupled to a power converter output, and a switching trigger input coupled to the inductor terminal.

Example 6. The apparatus of example 5, wherein the controller is configured to: within a first time period: provide a first control signal having a low state at the first control output, and provide a second control signal having a high state at the second control output; within a second time period after the first time period: provide the first control signal having a high state at the first control output, and provide the second control signal having the high state at the second control output; and within a third time period after the second time period: provide the first control signal having the low state at the first control output, and provide the second control signal having a low state at the second control output; wherein the first, second, and third time periods span a switching cycle period; wherein the first transistor is configured to be disabled responsive to the first control signal having the low state and to be enabled responsive to the first control signal having the high state; and wherein the second transistor is configured to be disabled responsive to the second control signal having the low state and to be enabled responsive to the second control signal having the high state.

Example 7. The apparatus of example 6, wherein the controller is configured to: receive a first voltage at the switching trigger input; receive a second voltage at the feedback input; detect a valley based on the first voltage; generate a comparison result based on a comparison between the second voltage and a target voltage; determine a start of the first time period based on the detection of the valley, and determine a start of the second time period based on the comparison result.

Example 8. The apparatus of example 7, wherein the comparison result is a first comparison result, the target voltage is a first target voltage, wherein the feedback input is a first feedback input, and the controller has a second feedback input coupled to the bias terminal and is configured to: receive a third voltage at the second feedback input; generate a second comparison result based on a comparison between the third voltage and a second target voltage; and determine a start of the second time period based on the second comparison result.

Example 9. The apparatus of any one of examples 1-8, wherein the first and second transistors are part of an integrated circuit.

Example 10. The apparatus of example 9, wherein the integrated circuit includes a first semiconductor die and a second semiconductor die; wherein the first transistor is in the first semiconductor die; and wherein the second transistor is in the second semiconductor die.

Example 11. The apparatus of any one of examples 1-10, further comprising: a transformer comprising a primary winding coupled between a power converter input and the inductor terminal, and a secondary winding coupled to a power converter output.

Example 12. The apparatus of any one of examples 1-11, further comprising an inductor coupled between a power converter input and the inductor terminal, and a diode coupled between the inductor terminal and a power converter output.

Example 13. The apparatus of any one of examples 1-12, further comprising a driver having a bias input, a driver input, and a driver output, the bias input coupled to the bias terminal, the driver input coupled to the first control output, and the driver output coupled to the first control terminal.

Example 14. A power conversion system, comprising: an inductor coupled between a power converter input and a switching terminal; a first transistor coupled between the switching terminal and a ground terminal, the first transistor having a first control terminal; a second transistor coupled between the switching terminal and a bias terminal, the second transistor having a second control terminal; a third transistor coupled between the second transistor and the ground terminal, the third transistor having a third control terminal; and a controller having first and second feedback inputs and first and second control outputs, the first feedback input coupled to a power converter output, the second feedback input coupled to the bias terminal, the first control output coupled to the first control terminal and the third control terminal, and the second control output coupled to the second control terminal.

Example 15. The power conversion system of example 14, further comprising a diode coupled between the second transistor and the bias terminal.

Example 16. The power conversion system of any one of examples 14-15, wherein the controller is configured to: within a first time period: provide a first control signal having a low state at the first control output, and provide a second control signal having a high state at the second control output; within a second time period after the first time period: provide the first control signal having a high state at the first control output, and provide the second control signal having the high state at the second control output; and within a third time after the second time: provide the first control signal having the low state at the first control output, and provide the second control signal having a low state at the second control output; wherein the first, second, and third time periods span a switching cycle period; wherein the first and third transistors are configured to be disabled responsive to the first control signal having the low state and to be enabled responsive to the first control signal having the high state; and wherein the second transistor is configured to be disabled responsive to the second control signal having the low state and to be enabled responsive to the second control signal having the high state.

Example 17. The power conversion system of example 16, wherein the controller has a switching trigger input coupled to the switching terminal, and the controller is configured to: receive a voltage at the switching trigger input; detect a valley based on the voltage; and determine a start of the first time period based on the detection of the valley.

Example 18. The power conversion system of example 17, wherein the voltage is a first voltage, and controller is configured to: receive a second voltage at the first feedback input; receive a third voltage at the second feedback input, generate a first comparison result based on a comparison between the second voltage and a first target voltage; generate a second comparison result based on a comparison between the third voltage and a second target voltage; determine a start of the third time period based on the first comparison result; and determine a start of the second time period based on the second comparison result.

Example 19. The power conversion system of any one of examples 14-18, further comprising: a capacitor coupled between the bias terminal and the ground terminal.

Example 20. A method comprising: at a first time, connecting a switching terminal of a power converter to a bias terminal, and disconnecting the switching terminal from a ground terminal, to generate a bias voltage by discharging parasitic capacitance of the power converter; at a second time after the first time, connecting the switching terminal to the ground terminal; and at a third time after the second time, disconnecting the switching terminal from the bias terminal and the ground terminal.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end user and/or a third party.

While the use of particular transistors is described herein, other transistors (or equivalent devices) may be used instead. For example, a p-channel field effect transistor (PFET) may be used in place of an n-channel field effect transistor (NFET) with little or no changes to the circuit. Furthermore, other types of transistors may be used (such as bipolar junction transistors (BJTs)). Furthermore, the devices may be implemented in/over a silicon substrate (Si), a silicon carbide substrate (SiC), a gallium nitride substrate (GaN) or a gallium arsenide substrate (GaAs).

References herein to a field effect transistor (FET) being "ON" means that the conduction channel of the FET is present and drain current may flow through the FET. References herein to a FET being "OFF" means that the conduction channel is not present and drain current does not flow through the FET. A FET that is OFF, however, may have current flowing through the transistor's body-diode and parasitic capacitances.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. An apparatus, comprising:
   a first transistor coupled between an inductor terminal and a ground terminal, the first transistor having a first control terminal;
   a second transistor coupled between the inductor terminal and a bias terminal, the second transistor having a second control terminal; and
   a controller having first and second control outputs, the first control output coupled to the first control terminal, the second control output coupled to the second control terminal.

2. The apparatus of claim 1, further comprising a diode coupled between a first current terminal of the second transistor and the bias terminal.

3. The apparatus of claim 1, further comprising:
   a capacitor coupled between the bias terminal and the ground terminal.

4. The apparatus of claim 1, further comprising a third transistor coupled between the second transistor and the ground terminal, the third transistor having a third control terminal coupled to the first control output.

5. The apparatus of claim 1, wherein the controller has a first input and a second input, the first input coupled to a power converter output, and the second input coupled to the inductor terminal.

6. The apparatus of claim 5, wherein the controller is configurable to:
   within a first time period:
      provide a first control signal having a first state at the first control output, and
      provide a second control signal having a second state at the second control output;
   within a second time period after the first time period:
      provide the first control signal having a second state at the first control output, and
      provide the second control signal having the second state at the second control output; and
   within a third time period after the second time period:
      provide the first control signal having the first state at the first control output, and
      provide the second control signal having a first state at the second control output;
   wherein the first, second, and third time periods span a switching cycle period;
   wherein the first transistor is disabled responsive to the first control signal having the first state and enabled responsive to the first control signal having the second state; and
   wherein the second transistor is disabled responsive to the second control signal having the first state and to be enabled responsive to the second control signal having the second state.

7. The apparatus of claim 6, wherein the controller is configurable to:
   receive a first voltage at the second input;
   detect a valley within the first voltage;
   receive a second voltage at the first input;
   generate a comparison result based on a comparison between the second voltage and a target voltage;
   determine a start of the first time period based on the detection of the valley within the first voltage; and
   determine a start of the third time period based on the comparison result.

8. The apparatus of claim 7, wherein the comparison result is a first comparison result, the controller has a third input coupled to the bias terminal and is configurable to:

receive a third voltage at the third input;
generate a second comparison result based on a comparison between the third voltage and a second target voltage; and
determine a start of the second time period based on the second comparison result.

9. The apparatus of claim 1, wherein the first and second transistors are part of an integrated circuit.

10. The apparatus of claim 9, wherein the integrated circuit includes a first semiconductor die and a second semiconductor die;
wherein the first transistor is in the first semiconductor die; and
wherein the second transistor is in the second semiconductor die.

11. The apparatus of claim 1, further comprising:
a transformer comprising a primary winding coupled between a power converter input and the inductor terminal, and a secondary winding coupled to a power converter output.

12. The apparatus of claim 1, further comprising an inductor coupled between a power converter input and the inductor terminal, and a diode coupled between the inductor terminal and a power converter output.

13. The apparatus of claim 1, further comprising a driver having a bias input, a driver input, and a driver output, the bias input coupled to the bias terminal, the driver input coupled to the first control output, and the driver output coupled to the first control terminal.

14. A system, comprising:
a first transistor coupled between a switching terminal and a ground terminal, the first transistor having a first control terminal;
a second transistor coupled between the switching terminal and a bias terminal, the second transistor having a second control terminal;
a third transistor coupled between the second transistor and the ground terminal, the third transistor having a third control terminal; and
a controller having first and second feedback inputs, and first and second control outputs, the first feedback input coupled to a power output, the second feedback input coupled to the bias terminal, the first control output coupled to the first control terminal and the third control terminal, and the second control output coupled to the second control terminal.

15. The system of claim 14, further comprising a diode coupled between the second transistor and the bias terminal.

16. The system of claim 14, wherein the controller is configurable to:
within a first time period:
provide a first control signal having a first state at the first control output, and
provide a second control signal having a second state at the second control output;
within a second time period after the first time period:
provide the first control signal having a second state at the first control output, and
provide the second control signal having the second state at the second control output; and
within a third time after the second time:
provide the first control signal having the first state at the first control output, and
provide the second control signal having a first state at the second control output;
wherein the first, second, and third time periods span a switching cycle period;
wherein the first and third transistors are configurable to be disabled responsive to the first control signal having the first state and to be enabled responsive to the first control signal having the second state; and
wherein the second transistor is configurable to be disabled responsive to the second control signal having the first state and to be enabled responsive to the second control signal having the second state.

17. The system of claim 16, wherein the controller has a an input coupled to the switching terminal is configurable to:
receive a voltage at the input;
detect a valley based on the voltage; and
determine a start of the first time period based on the detection of the valley.

18. The system of claim 17, wherein the voltage is a first voltage, and the controller is configurable to:
receive a second voltage at the first feedback input;
receive a third voltage at the second feedback input;
generate a first comparison result based on a comparison between the second voltage and a first target voltage;
generate a second comparison result based on a comparison between the third voltage and a second target voltage;
determine a start of the third time period based on the first comparison result; and
determine a start of the second time period based on the second comparison result.

19. The system of claim 14, further comprising:
a capacitor coupled between the bias terminal and the ground terminal.

20. A method comprising:
connecting a switching terminal of a power converter to a bias terminal and disconnecting the switching terminal from a ground terminal, to generate a bias voltage by discharging parasitic capacitance of the power converter;
connecting the switching terminal to the ground terminal; and
disconnecting the switching terminal from the bias terminal and the ground terminal.

21. The apparatus of claim 1, wherein the first and second transistors are configurable to split a current at the inductor terminal.

22. The system of claim 14, further comprising an inductor coupled between a power converter input and the switching terminal.

23. The method of claim 20, wherein the switching terminal is connected to the bias terminal and disconnedcted from a ground terminal at a first time, the switching terminal is connected to the ground terminal at a second time after the first time, and the switching terminal is disconnected from the bias terminal and the ground terminal at a third time after the second time.

* * * * *